United States Patent
Romanoff et al.

(10) Patent No.: US 6,820,980 B1
(45) Date of Patent: Nov. 23, 2004

(54) AUTOMATIC PAN AND TILT COMPENSATION SYSTEM FOR A CAMERA SUPPORT STRUCTURE

(75) Inventors: Andrew B. Romanoff, Los Angeles, CA (US); Michael J. Keesling, Westlake Village, CA (US); Christopher J. Verplaetse, Somerville, MA (US)

(73) Assignee: Panavision, Inc., Woodland Hills, CA (US)

( * ) Notice: Subject to any disclaimer, the term of this patent is extended or adjusted under 35 U.S.C. 154(b) by 95 days.

(21) Appl. No.: 10/104,478

(22) Filed: Mar. 22, 2002

Related U.S. Application Data
(60) Provisional application No. 60/278,095, filed on Mar. 23, 2001.

(51) Int. Cl.[7] .................. G03B 19/18; G03B 17/00; F16M 11/04
(52) U.S. Cl. .................. 352/243; 352/53; 396/428; 248/187.1
(58) Field of Search .................. 248/187.1, 177.1, 248/179.1; 396/419, 428; 352/53, 243; 348/142

(56) References Cited

U.S. PATENT DOCUMENTS

| | | | |
|---|---|---|---|
| 4,943,019 A | | 7/1990 | Mester |
| 5,644,377 A | * | 7/1997 | Romanoff et al. .......... 352/243 |
| 5,835,193 A | * | 11/1998 | Romanoff et al. .......... 352/243 |
| 5,900,925 A | * | 5/1999 | Navarro ........................ 352/53 |
| 6,094,215 A | * | 7/2000 | Sundahl et al. ............... 348/42 |
| 6,191,842 B1 | * | 2/2001 | Navarro ........................ 352/38 |
| 6,351,720 B1 | * | 2/2002 | Hoshina et al. ............. 702/154 |
| 6,552,744 B2 | * | 4/2003 | Chen ........................ 348/218.1 |
| 6,626,412 B1 | * | 9/2003 | Lindsay ...................... 248/550 |

\* cited by examiner

*Primary Examiner*—Judy Nguyen
*Assistant Examiner*—Arthur A Smith
(74) *Attorney, Agent, or Firm*—Morrison & Foerster LLP

(57) ABSTRACT

An automated system for compensating the pan and tilt of a camera head for the movements of a camera support structure and/or a subject matter. A processing system receives signals relating to the movement of the camera support structure, such as the swing, boom and telescope of the crane arm, the movements of a dolly, and preferably the movements of a subject matter. The system employs these inputs to determine the position of the camera and subject matter in a defined world coordinate system and sends signals to compensate the pan and tilt of the camera head so that the field of view of the camera is generally centered on the subject matter being filmed as defined within the system.

28 Claims, 17 Drawing Sheets

AUTOMATIC PAN AND TILT COMPENSATION SYSTEM FOR A CAMERA SUPPORT STRUCTURE

This application claims priority to provisional application Ser. No. 60/278,095 filed Mar. 23, 2001.

BACKGROUND OF THE INVENTION

The field of the present invention relates generally to camera positioning systems. For the purpose of this application a camera shall refer to any type of device capable of recording or transmitting either still or moving images including but not limited to conventional cinema cameras, conventional still cameras, television cameras, videotape cameras, digital cameras, CCD cameras, or the like.

Traditionally, camera cranes have been employed to assist in the positioning of cameras at defined locations and orientations to capture the desired shot. Conventional camera cranes are generally comprised of a crane arm (or "jib"), a support structure to which the crane arm is mounted, and a "leveling head" affixed to the distal end of the crane arm. Typically, the crane arm is pivotally coupled to the support structure in a manner that facilitates the rotation of the crane arm about a vertical and a horizontal axis. The rotation of the crane arm about the vertical axis is generally referred to as crane arm "swing," while the rotation of the crane arm about the horizontal axis is generally referred to as crane arm "boom." In addition to the crane arm being capable of swing and boom, conventional crane arms are often constructed to be adjustable in length, so that the crane arm can "telescope" from one length to another. Thus, the distal end of the crane arm (i.e., the end affixed to the leveling head) is capable of translating through a semi-sphere, the diameter of which is controlled by the overall length of the crane arm, which can be adjusted by telescoping the crane arm. Moreover, camera cranes are often mounted on a rolling platform that is generally referred to as a "dolly."

The leveling head is a mechanism that is typically employed to connect the camera crane arm to a camera mounting structure referred to as a "camera head." Leveling heads are generally comprised of a leveling mechanism that functions to maintain a "leveling plate" parallel to a defined plane in response to changes in the boom of the crane arm. As used in this application a "leveling plate" is a defined member of the leveling head that is adapted to being coupled to the camera head. An example of such a leveling head is disclosed in U.S. Pat. No. 4,943,019, which is hereby incorporated by reference.

Conventional camera heads, in addition to providing a support structure to securely mount the camera, are typically adapted to rotate about a vertical axis (i.e., panning) and a horizontal axis (i.e., tilting) relative to the leveling plate. To facilitate the panning and tilting of the camera head, two independently actuated motor mechanisms are usually employed. The first is often referred to as a "camera pan motor," which as the name suggests facilitates the panning of the camera head (i.e., the rotation of the camera head about the vertical axis). The second is often referred to as a "camera tilt motor," which also as the name suggests facilitates the tilting of the camera head (i.e., the rotation of the camera head about the horizontal axis).

In operation, the boom (i.e., the rotation of the crane arm about a horizontal axis), swing (i.e., the rotation of the crane arm about a vertical axis), telescope (i.e., the length of the crane arm), and the movement of the rolling platform or dolly are typically controlled manually by one or more operators or "grips." The adjustments of the leveling head are usually automated to respond to the change in the boom so as to maintain the camera head generally level to the horizontal plane. The "pan" and 'tilt' of the camera head together with the focus of the camera, on the other hand, have been traditionally controlled remotely (usually via electrical circuitry) by another operator, referred to as the "camera-operator," who is responsible for the composition of the shot (i.e., the field of view and focus of the camera).

Thus, the camera-operator, in fashioning the composition of the shot, must compensate the field of view of the camera by panning and tilting the camera head in response to movements of the crane arm, dolly, and the subject matter being filmed. In light of the complex dynamics of such systems, the camera-operator's task can be extremely difficult, especially when filming complicated shots. Consequently, situations inevitably arise where the field of view of the camera is not accurately or in a timely fashion compensated for the movements of the crane arm and/or dolly. In addition, situations also arise, with or without movement in the camera crane or dolly, where the field of view of the camera is not accurately compensated for the movement of the subject matter. As a result, considerable expense and time is expended in re-shooting.

To assist the camera operator in achieving the desired composition, some camera heads such as those disclosed in U.S. Pat. Nos. 5,644,377 and 5,835,193, which are hereby incorporated by reference, employ an automated back pan compensation mechanism that, when activated, pans the camera head in a reverse direction relative to the swing of the camera crane arm. The amount of pan compensation may be adjusted by the user prior or during filming. These compensation mechanisms, however, simply reverse pan the camera head in response to changes in the swing of the crane arm without reference to the other potential movements of the camera support structure (e.g., boom, telescope, or dolly movement) or changes in the position of the subject matter being filmed. Furthermore, these compensation mechanisms are not readily suited for achieving accurate back pan compensation in response to changes in the swing of the crane arm. This is so because there is non-linear relationship between changes in the angular position of the camera arm and the desired angular back pan of the camera head. Thus, these systems require adjustment/calibration of the back pan gain, especially when large changes in the swing of crane arm occur. Consequently, these compensation mechanisms, while potentially helpful in assisting the camera operator in panning the camera head in certain circumstances, may not provide suitable assistance in situations in which the movement of the camera support structure is more complex or when a change in the position of the subject matter occurs.

SUMMARY OF THE INVENTION

The present invention relates in one aspect to a camera positioning system, whereby the positioning system provides for compensation for the movement of the camera support structure. A separate aspect of the present invention relates to a camera positioning system, whereby the positioning system provides for compensation for the movement of a subject matter. Yet another separate aspect of the present invention relates to a camera positioning system, whereby the positioning system provides for compensation for the movement of both the camera support structure and the subject matter. Two or more of these aspects may be combined.

Additional embodiments, features, variations and advantages of the invention are set forth in the description and accompanying drawings that follow, and are fither evident on consideration thereof.

BRIEF DESCRIPTION OF THE DRAWINGS

The accompanying drawings illustrate presently preferred implementations of the invention and, together with the description, serve to explain various principles of the invention.

DESCRIPTION OF THE PREFERRED EMBODIMENTS

Figure 1:
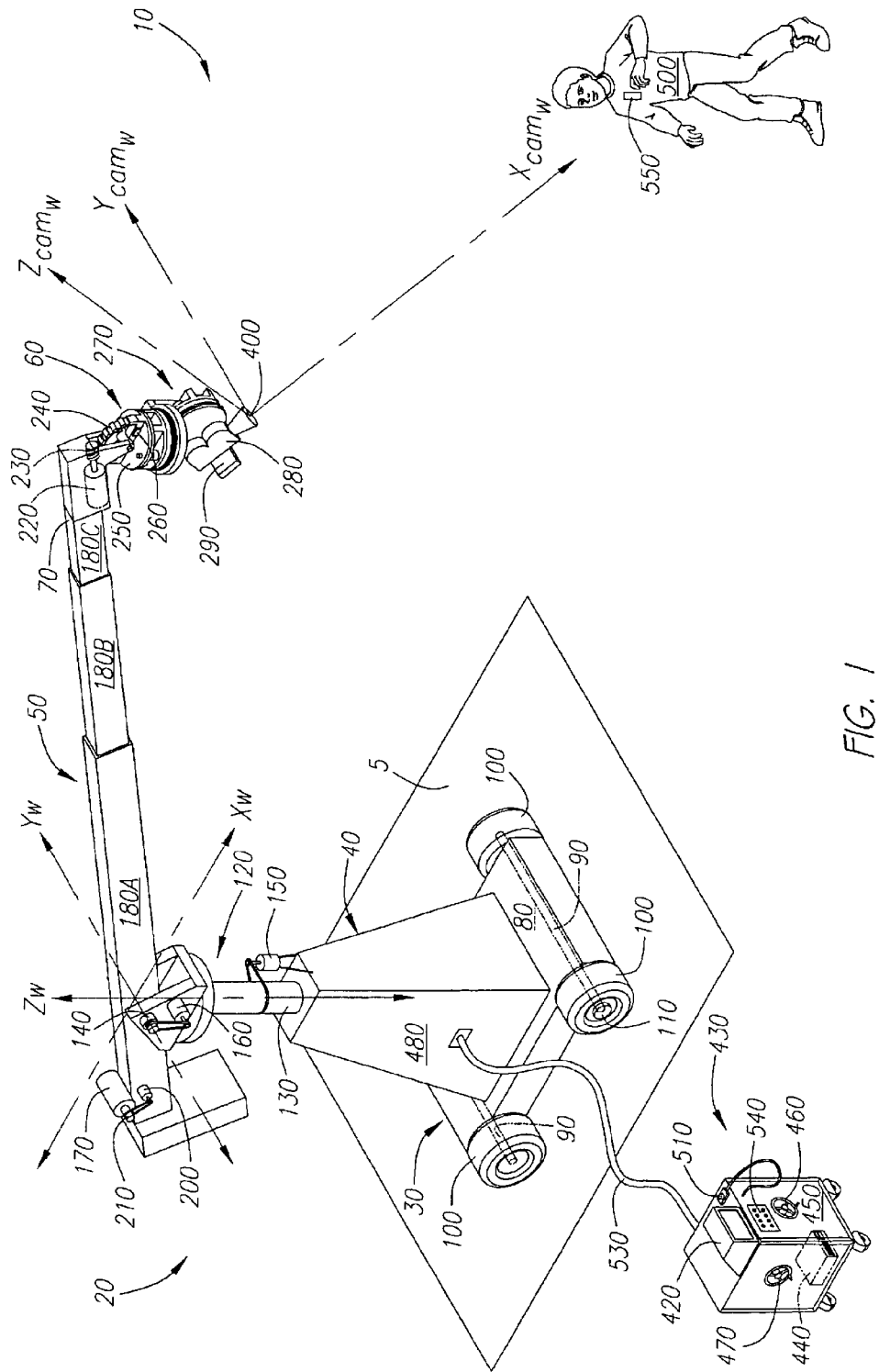
FIG. 1 is a perspective view of a preferred embodiment of a camera positioning system including a remote camera head.

The preferred embodiments will now be described with reference to the drawings. To facilitate description, any reference numeral designating an element in one figure will designate the same element if used in any other figure. The following description of the preferred embodiments is only exemplary. The present invention is not limited to these embodiments, but may be realized by other embodiments. Furthermore, in describing preferred embodiments, specific terminology will be resorted to for the sake of clarity. However, the invention is not intended to be limited to the specific terms so selected.

FIG. 1 is a perspective view of a preferred camera positioning system 10 depicting components capable of being used in connection with preferred automatic pan and tilt compensation control system architectures described herein. Shown in FIG. 1 is a preferred configuration of a camera support structure 20 capable of movement with multiple degrees of freedom. The camera support structure 20 is comprised of a movable platform or dolly 30, a crane arm support structure 40 mounted on the dolly 30, a telescoping crane arm 50 pivotally mounted to the crane arm support structure 40, and a leveling head 60 mounted to the distal end 70 of a the crane arm 50.

The dolly 30 includes a base structure 80 to which the crane arm support structure 40 is mounted. To facilitate movement of the dolly 30, the base structure 80 includes two axles 90 (shown in phantom) with each axle having two wheels 100 mounted thereto. A dolly sensing device 110 is employed to monitor the movement of the dolly 30 and transmit via "suitable communication means" data relating to the movement of the dolly 30 to a processing system 440 (shown in phantom in FIG. 1). For the purposes of this application "suitable communications means" shall mean electrical, electromagnetic, optical, mechanical or any other means suitable for transferring data between the sensing device and the processing system employed. Also for the purposes of this application "movement" shall mean the act, process, or result of moving.

In the system 10 illustrated in FIG. 1, the dolly 30 is configured to be capable of rolling back and forth on a support surface 5 in a direction that is generally parallel to the axis depicted in FIG. 1 as $X_w$. It is sufficient, in such a configuration, that the dolly sensing device 110 be comprised of a single rotary encoder, such as part number 8-5800-2146-5000 manufactured by Fritz Kubler GMBH of Germany that is fitted to one of the four wheel/axle assemblies 100/90 of the dolly 30 and adapted to monitor the rotation of the wheel 100 relative to axle 90 and transmit data relating to the rotation of the axle 90 to the processing system 440 via electrical communications transmitted through electrical cable 530.

It is contemplated, however, that other dolly configurations may be capable of different or additional movement. For example, the dolly 30 may be adapted to move in a manner similar to an automobile or tricycle or may be configured to slide back and forth, shift from side to side or move up or down. The dolly sensing device 110 employed, however, should preferably be capable of monitoring sufficient stimuli relating to the movement or position of the dolly 30 so that changes in the position and orientation of the dolly 30 may be determined with reference to the relevant structural configuration of the particular dolly 30 employed.

The crane arm 50 is preferably mounted in a suitable fashion to the crane arm support structure 40 via a coupling mechanism 120. The coupling mechanism 120 facilitates, via a rotatable support shaft 130, the rotation of the crane arm 50 about a vertical axis, which in FIG. 1 corresponds with the axis called out as $Z_w$, so as to permit changes in the swing angle of the crane arm 50. In addition, the coupling mechanism 120 facilitates, via a horizontal pivot 140, the rotation of the crane arm 50 about a horizontal axis, which in FIG. 1 corresponds with the axis called out as $Y_w$, so as to permit changes in the boom angle of the crane arm 50.

A crane arm swing sensing device 150 is employed to monitor the swing (i.e., the rotation of the crane arm about the vertical axis) of the crane arm and transmit via suitable communication means data relating to crane arm swing to the processing system 440. Similarly, a crane arm boom sensing device 160 is employed to monitor the boom (i.e., the rotation of the crane arm about the horizontal axis) of the crane arm and transmit via suitable communication means data relating to the crane arm boom to the processing system 440.

In the system 10 illustrated in FIG. 1, the swing and boom sensing devices 150, 160 may individually comprise a rotary encoder such as part number 8-5800-2146-5000 manufactured by Fritz Kubler GMBH of Germany. As illustrated in FIG. 1, the rotary encoder swing sensing device 150 employed to monitor the swing of the crane arm 50 is preferably fitted to the housing 480 of the support structure 40 and monitors via a toothed belt the rotation of the support shaft 130 relative to housing 480. Similarly, the rotary encoder boom sensing device 160 employed to monitor the crane arm boom is preferably mounted to the side wall of the coupling mechanism 120 and monitors via a toothed belt the relative rotation of the horizontal pivot 140. Each of the encoder sensing devices 150, 160 are adapted to transmit data relating to their respective monitored stimuli to the processing system 440 via electrical communications transmitted through electrical cable 530.

The telescoping crane arm 50 is preferably comprised of nested sections 180A, 180B, and 180C configured so that each inner section is supported within the outer adjacent section. Extension of the crane arm inner sections 180B, 180C is preferably controlled by means of a crane arm telescope motor 170 mounted at the end of the crane arm 50 opposite the leveling head 60. The crane arm telescope motor 170 supplies drive via a cable and pulley mechanism 190 (not illustrated) such as that disclosed in U.S. Pat. No. 4,939,019, already incorporated by reference, so as to facilitate the extension and retraction of the crane arm sections 180B, 180C.

A crane arm telescope sensing device 200 is employed to monitor the telescope (e.g., length) of the crane arm 50 and transmit data via suitable communication means relating to the crane arm telescope to the processing system 440. In the system 10 illustrated in FIG. 1, the crane arm telescope sensing device 200 comprises a rotary encoder, such as part number BDE 05.05A500 manufactured by Baumer Electric of Switzerland. As illustrated in FIG. 1, the encoder telescope sensing device 200 is mounted to the wall of crane arm section 180A and is adapted to monitor via a toothed belt the rotation of the drive shaft 210 of the crane arm motor 170. The encoder telescope sensing device 200 is also preferably adapted to transmit data relating to the rotation of the drive shaft 210 to the processing system 440 via electrical communications transmitted through electrical cable 530.

Figure 2:
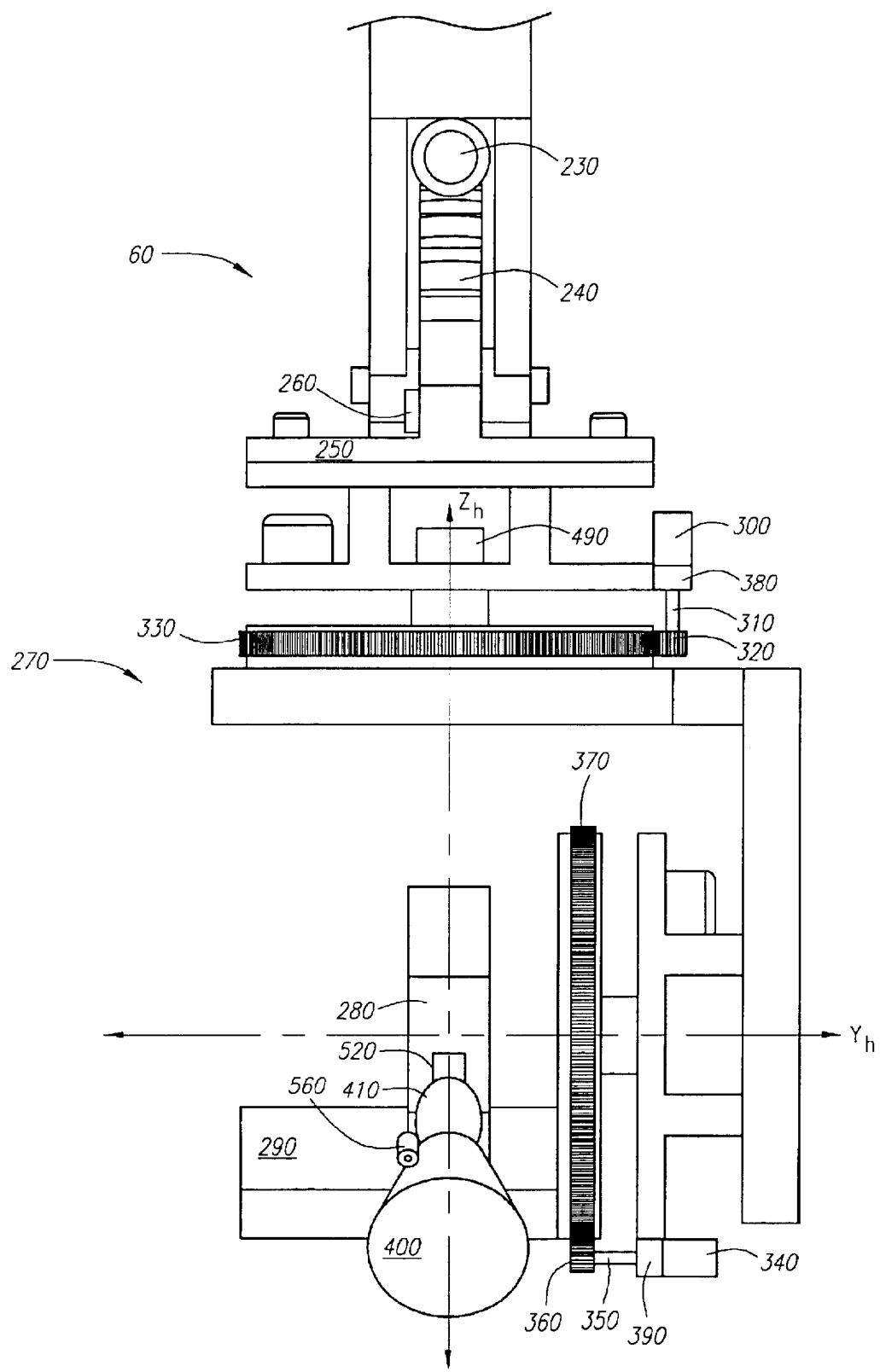
FIG. 2 is a detailed illustration of the remote camera head depicted in FIG. 1.

The leveling head 60 is preferably configured to be removably coupled to the distal end 70 of the innermost crane arm section 180C. A leveling head motor 220 (shown in phantom) is mounted within the housing of the leveling head 60 and drives a worm 230 that is adapted to engage a semicircular worm gear 240, the base of which defines a leveling plate 250. As best seen in FIG. 2, a level sensor 260, such as a mercury tilt switch, is fitted to the worm gear 240 just above the leveling plate 250 and is electrically connected to the leveling head motor 220. The level sensor 260 is configured to activate the leveling head motor 220 to maintain the leveling plate 250 horizontal with respect to a defined plane (e.g., horizon, ground, etc.) in response to changes in the boom of the crane arm 50.

As best illustrated in FIG. 2, secured to the leveling plate 250 is a remote camera head 270 having a motion picture camera 280 secured to a mounting platform 290.

The camera head 270 is further comprised of a pan motor 300 that drives via an axle 310 a gear head 320, which engages a pan gear ring 330 that when driven rotates the mounting platform 290 about a vertical axis depicted in FIG. 2 as $Z_h$. In addition, the camera head 270 is comprised of a tilt motor 340 that drives via an axle 350 a gear head 360, which engages a tilt gear ring 370 that when driven rotates the mounting platform 290 about a horizontal axis in FIG. 2 as $Y_h$.

A pan sensing device 380 is employed to monitor the pan (i.e., the movement or rotation of the camera head about the vertical axis $Z_h$) of the camera head 270 and transmit via suitable communication means data relating to camera head pan to the processing system 440. Similarly, a tilt sensing device 390 is employed to monitor the tilt (i.e., the movement or rotation of the camera head about the vertical axis $Y_h$) of the camera head 270 and transmit via suitable communication means data relating to the camera head tilt to the processing system 440.

In the system illustrated in FIGS. 1 and 2, the pan and tilt sensing devices 380, 390 may each be comprised of an encoder such as part number BDE 05.05A500 manufactured by Baumer Electric of Switzerland. Each encoder is fitted to its corresponding axles 310, 350 of the pan and tilt motors 300, 340 and is adapted for monitoring the rotation of respective axles 310, 350 and for transmitting data relating to the rotation of the axles 310, 350 to the processing system 440 via electrical communication transmitted through electrical cable 530. It is to be understood that other types of camera heads may also be utilized. For example a gyro stabilized camera head such as Westcam gyro stabilized head manufactured by Westcam Corporation of Canada may be employed.

The camera 280 is comprised of a camera lens 400 such as a Panavision 11 to 1 zoom lens and lens motor 410 such as Panavision FTZAC motor, both of which are manufactured by Panavision Corporation of United States of America. The lens motor 410 being adapted to actuate a change in the plane of focus of the camera lens 400. To facilitate the camera operator's observations of the composition of the shot, the images captured by the camera 400 are preferably transmitted in real-time via suitable communication means, such as the electrical cable 530, to a camera monitor 420 (illustrated in FIG. 1).

As illustrated in FIG. 1, the camera monitor 420 is preferably located on a camera operator control module 430. The camera operator control module 430 is preferably displaceable from the camera support structure 20 so as to provide suitable room for manipulation of the camera support structure 20, thereby minimizing potential for interference between the camera support structure 20 and the camera operator control module 430. It is to be understood, however, that the camera operator control module 430 may be otherwise located for example it may be integrated with the support structure 20 such as in a traditional platform based camera crane such as that illustrated in FIGS. 6A and 6B of U.S. Pat. No. 5,644,377 previously incorporated by reference. The control module 430 is comprised of a compartment 450 preferably adapted to being movable. Preferably housed within the compartment 450 is the processing system 440 (shown in phantom). As will be discussed in more detail below, the processing system 440 generally receives data from one or more sensing devices, processes that data, and transmits signals to compensate the pan and tilt of the camera head 270 to maintain the camera's field of view on a desired subject matter 500, the position of which is defined within the processing system 440 relative to a predefined coordinate system. It is to be understood that the subject matter 500 as defined within the processing system 440 is simply a defined position in space within the coordinate system being employed, which does not necessarily correlate with the location of a particular physical entity. The processing system 440 is activated via a system activation/calibration control 540 preferably located on the camera operator control module 430. In the preferred embodiment, the system activation/calibration control 540 is comprised of a panel of switches that are capable of activating and/or setting the calibration of the processing system 440. Other suitable input devices, such as keyboard or the like, may also be employed and may be configured to receive input from the user relating to the particular logic to be employed by the processing system 440 in compensating the pan and tilt, in calibrating the system, or in defining the position of the subject matter 500.

Due to the wide variety of computational devices and programming available to implement the functions of the processing system 440, the processing system 440 is broadly defined as one or more computational devices capable of performing the functions described herein. For example, the processing system 440 may be embodied as a computer such as is manufactured by IBM™ or Apple™, a server such as is manufactured by Sun Microsystems™, or a main frame computer. The processing system 440 may be configured to process analog or digital signals. The processing system 440 may be comprised of general purpose or special purpose CPUs, it may have volatile or non-volatile memory, and it may have programming for enabling the receipt, processing and transmission of communications over the communications means employed. The processing system 440 may employ multiple processors that perform different processing tasks, or have the same tasks distributed between processors. Further, the processing system 440 may processes some or all of the processing via hard-wired circuitry such as an ASIC, FPGA or other logic devices including analog circuit elements such as analog multipliers and trig function potentiometers. Thus, as used throughout, processing system refers to a wide variety of computational devices or means for implementing the functions described herein, namely the receipt of communications from one or more sensing devices, the processing of those communications, and the transmission of suitable communications for actuating the pan and tilt of the camera head 270. The processing system may additionally be configured to store information (e.g., meta-data) that it receives or transmits for later use or additional analysis.

To facilitate a camera operators control of the pan and tilt of the camera head 270, camera operator pan compensation control device 460 and a camera operator tilt compensation control device 470 are provided and employed. The pan and tilt compensation control devices 460, 470 are in communication via suitable communications means with the pan and tilt motors 300, 340.

As illustrated in FIG. 1, the pan and tilt compensation control devices 460, 470 are comprised of rotating hand wheels and tachometers (not shown). Each tachometer monitors the rotation of the corresponding pan and tilt hand wheels and sends electrical signals via the electrical cable 530 to a camera head servo amplifier 490 (illustrated in FIG. 2), which actuates the pan and tilt motors 300, 340.

In order to facilitate the camera operator's control over the focus of the camera lens 400, a remote camera lens control device 510 is employed to focus the camera lens 400. The camera lens control device 510 is in communication with the camera lens motor 410 via suitable communications means.

As illustrated in FIG. 1, the camera lens control device 510 may be comprised of a dial control device such as a Panavision FTZAC control, manufactured by Panavision Corporation of the United States of America. The dial control device 510 is preferably configured to transmit, in response to the rotation of the dial, electrical signals via the electrical cable 530 to a camera lens servo amplifier 520 (best illustrated in FIG. 2), which actuates the lens motor 410 to change the focus of the lens 400. The camera-operator may monitor the focus of the lens via the camera monitor 420.

It is to be understood that while certain sensing devices, such as rotary encoders, have been illustrated, other sensing devices may also be employed such as accelerometers, magnetometers, linear variable differential transformers, rotary variable differential transformers, laser triangulation, laser interferometry, gyroscopes, capacitance tilt sensors, mass tilt sensors, potentiometers, laser time of flight devices, sonar, radar global positioning, and any other suitable device capable of or adaptable to sensing stimuli that can be correlated to the movement or change in position of a structure or combination of structures.

Furthermore, as can be surmised from the sensing devices listed above, it is to be understood that the sensing device(s) employed need not be mounted physically on the structure being monitored. Moreover, it is to be understood that while one or more sensing devices may be employed to monitor each degree of freedom of movement and/or each individual moving element of the support structure 20, the sensing device(s) employed need not do so. The sensing device(s) employed may only include sufficient capability so that the position or change in position of the camera 280, or an approximation thereof, may be determined in relationship to a coordinate system, preferably in 3-dimensional space. For example, the camera support structure sensing device(s) 600 may include sufficient capability for determining the position of the distal end 70 of the camera crane arm 50 or the position and/or orientation of the leveling head 60, which can be correlated to the position of the camera 280. Thus, it is contemplated that a single sensing device such as a GPS device may be employed to monitor the movement or position of the distal end 70 of the camera support structure 20, the leveling head 60, or the camera 280.

Figure 3:
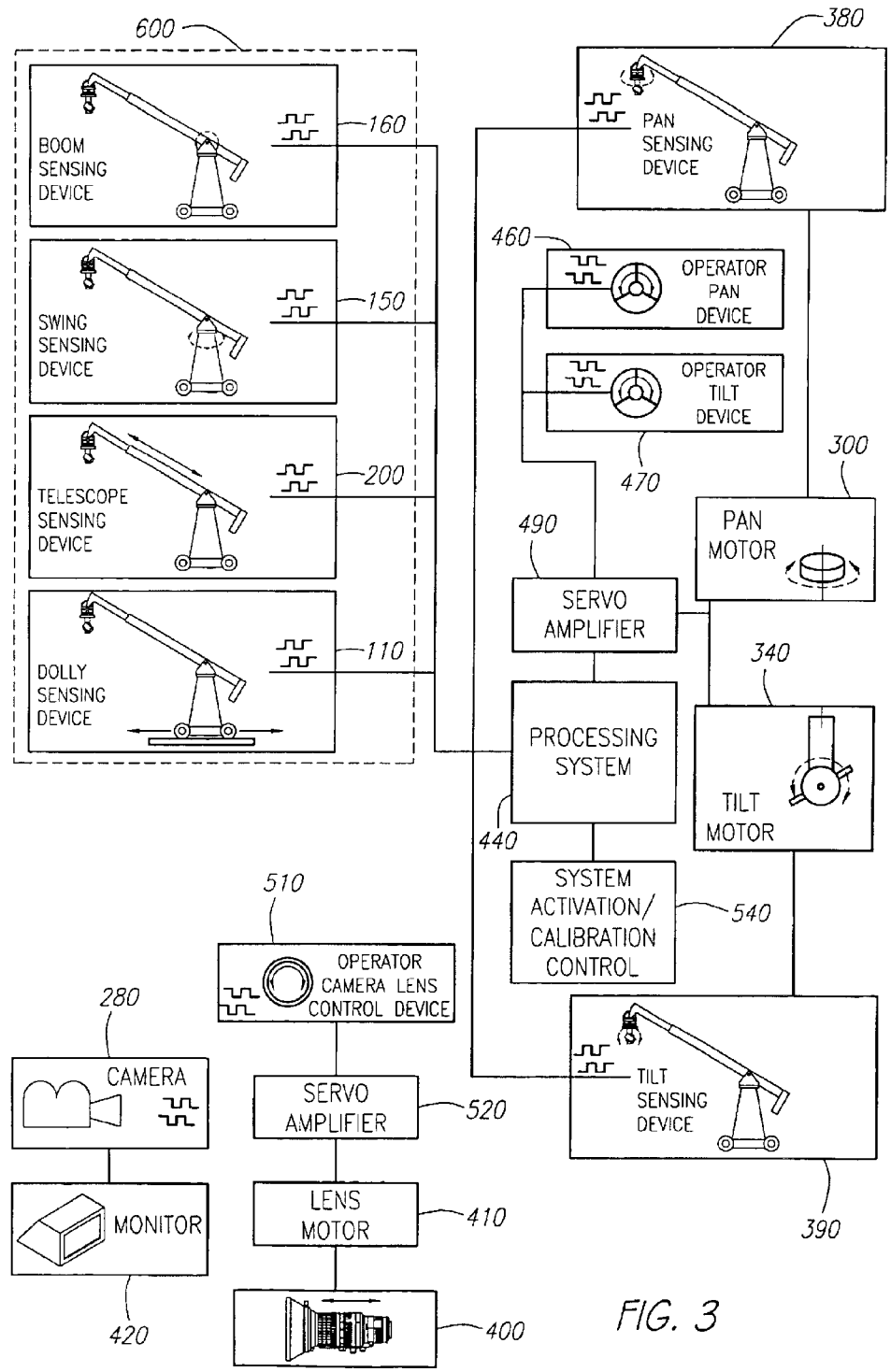
FIG. 3 is a block diagram illustrating a first preferred automatic pan and tilt compensation control system architecture capable of being used in connection with the camera positioning system illustrated in FIG. 1.

FIG. 3 is a block diagram illustrating a first preferred automatic pan and tilt compensation control system architecture capable of being used in connection with the camera positioning system 10 illustrated in FIG. 1. As shown in FIG. 3 camera support structure sensing device(s) 600 preferably including crane arm boom, crane arm swing, crane arm telescope, and dolly sensing devices 160, 150, 200, 110 together with the pan and tilt sensing devices 380, 390 are in communication with processing system 440. Operator pan and tilt compensation control devices 460, 470 are in communication with the camera head servo amplifier 490, which is in communication with pan and tilt motors 300, 340. In addition, the processing system 440 is in communication with the camera head servo amplifier 490. Activation of the processing system 440 is controlled by the system activation/calibration control 540.

Independently, the remote operator camera lens control device 510 is in communication with the camera lens servo amplifier 520, which is in communication with lens motor 410, which in turn focuses the camera lens 400. Also, to facilitate the transmission of images captured by the camera for viewing by the camera operator, the camera 280 is in independent communication with the camera monitor 420.

In operation, a world coordinate system is defined within the processing system 440 relative to an initial position of the camera support structure 20 (e.g., the position of the camera support structure 20 at the time the system 10 is activated). In FIG. 1, the world coordinate system is depicted by the axis identified as $X_w$, $Y_w$, and $Z_w$. The origin of the world coordinate system is preferably defined to coincide with an initial position of the coupling mechanism 120 (e.g., centered at the horizontal pivot 140). The XW axis is preferably defined to coincide with the direction and orientation of the crane arm 50 when the crane arm swing and boom angles are zero. In other words, when the crane arm's boom component is horizontal with or parallel with the ground plane or support surface 5 and when the crane arm's boom component is parallel with the line defined by the forward direction of the dolly 30. Once defined, the world coordinate system is the coordinate system by which objects and structures are located in three-dimensional space within the processing system 440. It is to be understood that coordinate systems other than a Cartesian coordinate system may be employed such as a polar coordinate system. It is also to be understood that the coordinate system employed need not have its origin located at an initial position of the support structure 20.

Figure 4:
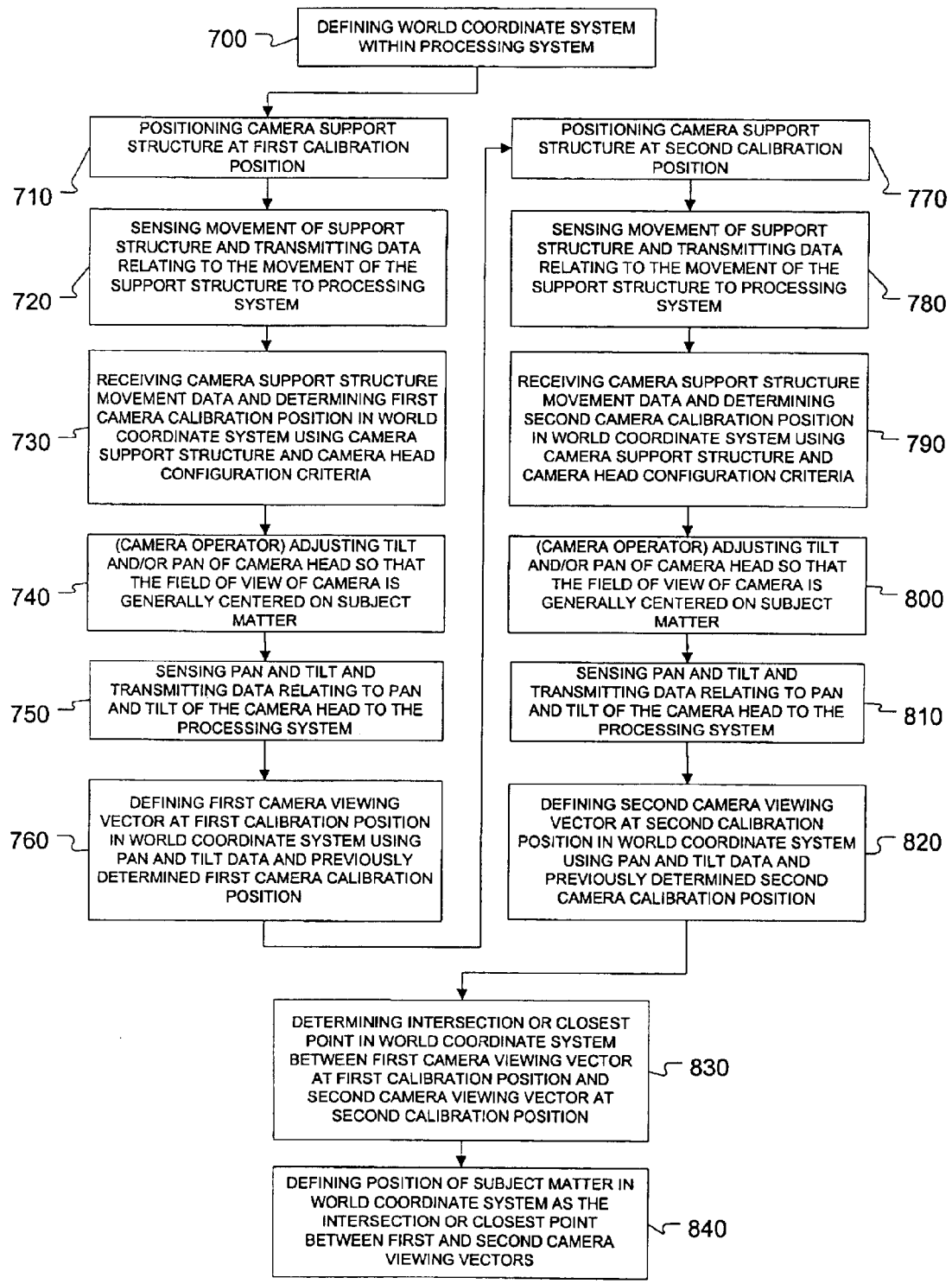
FIG. 4 is a flow chart detailing preferred steps for defining the position of a subject matter relative to a defined world coordinate system in accordance with the first preferred automatic pan and tilt compensation control system architecture illustrated in FIG. 3.
Figure 5:
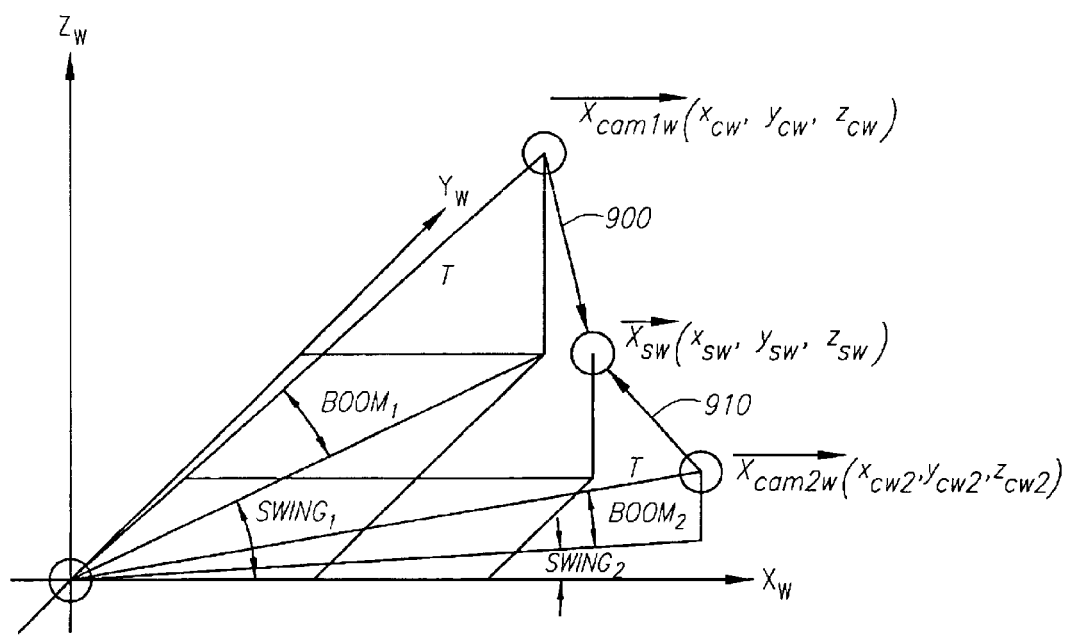
FIG. 5 is a vector diagram illustrating, with respect to a defined world coordinate system, a first and second camera viewing vector for a first and second camera position and a defined subject matter position.

FIG. 4 illustrates a flow chart detailing preferred steps for defining the position of a subject matter relative to the defined world coordinate system in accordance with the first preferred automatic pan and tilt compensation control system architecture illustrated in FIG. 3. As shown in FIG. 4, defined within the processing system 440, as previously discussed, is the world coordinate system (step 700). Once defined, the camera support structure 20 is positioned at a first calibration position (step 710). The camera support structure sensing device(s) 600 senses movement, if any, (e.g., change in boom, swing, telescope, dolly) of the support structure 20 and transmit data relating to the movement of the support structure 20 to the processing system 440 (step 720). The processing system 440 receives the data from the camera support structure sensing device(s) 600 and determines from the data a first camera calibration position using camera support structure 20 and camera head 270 configuration criteria (step 730). As illustrated in FIG. 5, the first camera calibration position is called out as $\overrightarrow{Xcam1w}$ and is defined by coordinates $X_{CW}$, $Y_{cw}$, $Z_{cw}$ in the world coordinate system $X_w$, $Y_w$, $Z_w$.

The camera support structure and camera head configuration criteria employed in the determination of step 730 is dependent on the particular camera support structure and camera head configuration employed in connection with the particular sensing devices employed. Preferably, the criteria employed should include sufficient information to correlate the sensor data of the monitored stimuli to the position of camera 280 or camera lens 400. For example in the preferred embodiment illustrated in FIG. 1, the criteria may include information to correlate the data relating to the rotation of the axle 90 of the dolly 30 to a measurement of the change in position of the dolly 30. Another example is that the criteria may include information regarding a particular dimensional offset such as the dimension between the position of the camera 280 and a given reference point such as the leveling plate 250 or the distal end 70 of the camera crane arm 50. Yet another example is that the criteria may include consideration relating to the dynamics of the particular leveling head 60 or camera head 270 employed. In sum, the location or change in position within the coordinate system of the camera 280 may be determined from the totality of the configuration criteria employed in connection with the sensing devices employed and the data derived therefrom.

Once the camera support structure 20 is positioned at the first calibration position, the camera-operator adjusts via the camera-operator pan and tilt compensation devices 460, 470 the pan and tilt of the camera head 270 so that the field of view of the camera 280 is generally centered in the desired position on the subject matter 500 (step 740). The pan and tilt sensing devices 380, 390 transmit to the processing system position data relating to the pan and tilt of the camera head 270 (step 750). The processing system 440 receives the data from the pan and tilt sensing devices 380, 390 and defines a first camera viewing vector (called out as 900 in FIG. 5) for the first camera calibration position in the world coordinate system using the data from pan and tilt sensing devices and the previously determined first camera calibration position (step 760). After the support structure 20 is positioned at the first calibration position, the camera operator via the system activation/calibration control 540 may in a preferred implementation set the first calibration position in the processing system 440 and thereby affirmatively identify the calibration position that the operator wishes the processing system 440 to employ.

The camera support structure is then positioned at a second calibration position (step 770). The camera support structure 20 sensing device(s) 600 senses movement of the camera support structure 20 and transmits data relating to the movement of the camera support structure 20 to the processing system 440 (step 780). The processing system 440 receives data from the camera support structure sensing device(s) 600 and determines from the data a second camera calibration position using camera support structure 20 and camera head 270 configuration criteria (step 790) as previously discussed in relation to step 730. As illustrated in FIG. 5, the second camera calibration position is called out as $\overrightarrow{Xcam2w}$ and is defined by coordinates $X_{cw2}$, $Y_{cw2}$, $Z_{CW2}$ in the world coordinate system $X_w$, $Y_w$, $Z_w$.

After positioning the camera support structure 20 at the second calibration position, the camera operator again adjusts via the camera-operator pan and tilt compensation devices 460, 470 the pan and tilt of the camera head 270 so that the field of view of the camera is generally centered on the subject matter 500 (step 800) as it was in step 740. The pan and tilt sensing devices 380, 390 again transmit to the processing system 440 data relating to the pan and tilt of the camera head 270 (step 810). The processing system 440 receives the data from the pan and tilt sensing devices 380, 390 and defines a second camera viewing vector (called out as 910 in FIG. 5) for the second calibration position in the world coordinate system using the data from the pan and tilt sensing devices and the previously determined second camera calibration position (step 820). After the support structure 20 is positioned at the second calibration position, the camera operator via the system activation/calibration control 540 may in a preferred implementation set the second calibration position in the processing system 440 and thereby affirmatively identify the calibration position that the operator wishes the processing system 440 to employ.

Once the processing system 440 has determined the two camera viewing vectors, 900, 910 in reference to the world coordinate system and their corresponding calibration positions, the processing system 440 determines the intersection or closest point between the first and second camera viewing vectors in the world coordinate system (step 830). The processing system 440 then defines the position of the subject matter 500 in the world coordinate system as the intersection or closest point between the first and second camera viewing vectors (step 840).

The camera position and camera viewing vector may be calculated via the application of established mathematical principles. With reference to FIG. 5, a simplified example of such calculations follows. In this example the camera position will be estimated to be the same as the distal end 70 of the camera crane 50 and the dolly 30 is assumed to have not moved from its initial position in which the world coordinate system was defined (i.e., the crane arm at the horizontal pivot 140 is still centered at the origin of the world coordinate system). Consequently, dimensional offsets from the distal end 70 of the crane arm 50 to the camera are not included in these calculations.

The camera position of the first camera calibration position, $\overrightarrow{Xcam1w}$, may be calculated with respect to the world coordinate system via the following equation:

$$\overrightarrow{Xcam1w} = \begin{bmatrix} x_{cw} \\ y_{cw} \\ z_{cw} \end{bmatrix} = \text{First Camera Calibration Position}$$

Where:

$$x_{cw} = T \times \cos(\text{boom angle}) \times \cos(\text{swing angle}) \quad (1)$$

$$y_{cw} = T \times \cos(\text{boom angle}) \times \sin(\text{swing angle})$$

$$z_{cw} = T \times \sin(\text{boon angle})$$

$T$ = Telescope of crane arm (distance from origin of world axes to camera)

The boom and swing angle together with the telescope of the crane arm 50 is determined from the camera support structure sensing device(s) 600. Assuming that a leveling head 60 is employed to maintain the leveling plate 250 level with the ground 5 with changes in the boom angle of the crane arm 50, the first camera viewing vector (called out as 900 in FIG. 5) may be calculated as follows:

A. First rotate the camera through the swing angle of the camera crane:

$$\overrightarrow{x'camw} = Rrw(\text{swing angle}) \times \overrightarrow{Xcamw} \quad (2)$$

where:

$\overrightarrow{Xcamw}$ = defines the initial non-rotated direction of the camera axis that is perpendicular to the face of teh lens $$R_{zw}(\text{swing angle}) = \begin{bmatrix} \cos(\text{swing angle}) & -\sin(\text{swing angle}) & 0 \\ \sin(\text{swing angle}) & \cos(\text{swing angle}) & 0 \\ 0 & 0 & 1 \end{bmatrix}$$

B. Next, the camera is rotated through the pan angle of the camera head:

$$\overrightarrow{X''camw} = Rrw(\text{pan angle}) \times \overrightarrow{X'camw} \quad (3)$$

where:

$$R_{zw}(\text{pan angle}) = \begin{bmatrix} \cos(\text{pan angle}) & -\sin(\text{pan angle}) & 0 \\ \sin(\text{pan angle}) & \cos(\text{pan angle}) & 0 \\ 0 & 0 & 1 \end{bmatrix}$$

C. Lastly, the camera is rotated through the tilt angle of the camera head (three-part calculation):

i. First, the camera axis is rotated so that world Y-axis, $Y_W$ and camera Y-axis, $Y_W$, are parallel, the following equation may be used:

$$\overrightarrow{x'''_{camwA}} = \begin{bmatrix} \overrightarrow{y''_{camw}}(2) & -\overrightarrow{y''_{camw}}(1) & 0 \\ \overrightarrow{y''_{camw}}(1) & \overrightarrow{y''_{camw}}(2) & 0 \\ 0 & 0 & 1 \end{bmatrix} \overrightarrow{x''_{camw}} \quad (4)$$

ii. Second, the camera axis is rotated about the world y-axis, $Y_W$, in amount equal to the tilt angle.

$$\overrightarrow{x'''_{camws}} = \begin{bmatrix} \cos(\text{tilt angle}) & 0 & -\sin(\text{tilt angle}) \\ 0 & 1 & 0 \\ \sin(\text{tilt angle}) & 0 & \cos(\text{tilt angle}) \end{bmatrix} \overrightarrow{x'''_{camwA}} \quad (5)$$

iii. Third, the camera is rotated back through inverse of step (i) matrix $$\overrightarrow{x'''_{camw}} = \begin{bmatrix} \overrightarrow{y''_{camw}}(2) & -\overrightarrow{y''_{camw}}(1) & 0 \\ \overrightarrow{y''_{camw}}(1) & \overrightarrow{y''_{camw}}(2) & 0 \\ 0 & 0 & 1 \end{bmatrix}^{-1} \overrightarrow{x'''_{camwB}} \quad (6)$$

Consequently, the camera viewing vector:

$$\overrightarrow{CVV1w} \quad (6)$$

is equal to:

$$\overrightarrow{X'''camw}$$

These calculations are repeated for the second calibration position of the camera, $\overrightarrow{Xcam2w}$ to obtain the second camera viewing vector, $CVV_{2w}$ (called out as 910 in FIG. 5). Consequently, two three-dimensional camera view line equations consisting of a camera position and camera viewing vector may be expressed as:

$$Cam1 = \overrightarrow{Xcam1w} + t(\overrightarrow{CVV1w})$$

$$Cam2 = \overrightarrow{Xcam2w} + s(\overrightarrow{CVV2w}) \quad (7)$$

The intersection of the two calibration lines or closest point thereto (e.g., the midpoint of the shortest distance line segment between the two calibration lines) in three-dimensional space may be calculated as follows. For simplicity, the components of equation (7) will be temporarily renamed as follows:

$$r_1 + ee = \overrightarrow{A} + 30\ t(+e, rar\ B)$$

$$\overrightarrow{r_2} = \overrightarrow{C} + s(\overrightarrow{D}) \quad (8)$$

The shortest distance between the two lines can be found with the following equation:

$$d = \frac{(\overrightarrow{C} - \overrightarrow{A}) \cdot \overrightarrow{B} \times \overrightarrow{D}}{|\overrightarrow{B} \times \overrightarrow{D}|} \quad (9)$$

To determine the three-dimensional coordinates of the shortest line segment between $r_1$ and $r_2$, this point is allowed to exist between two points, "m" and "n", on the two lines. The segment mn can be described with equation (8) as:

$$\overrightarrow{mn} = (\overrightarrow{C} + s\overrightarrow{D}) - (\overrightarrow{A} + t\overrightarrow{B}) \quad (10)$$

Given that the shortest line segment, mn, is perpendicular to both camera view lines $Cam_1$ and $Cam_2$ and therefore $r_1$ and $r_2$ let:

$$\overrightarrow{B} \cdot \overrightarrow{mn} = 0$$

$$\overrightarrow{D} \cdot \overrightarrow{mn} = 0 \quad (11)$$

Solving these equations will yield values for "t" and "s".

$$\overrightarrow{B} \cdot \overrightarrow{mn} = 0$$

$$\overrightarrow{B} \cdot [(\overrightarrow{C} - \overrightarrow{A}) = s\overrightarrow{D} - t\overrightarrow{B}] = 0$$

$$\overrightarrow{B} \cdot (\overrightarrow{C} - \overrightarrow{A}) = \overrightarrow{B} \cdot s\overrightarrow{D} - \overrightarrow{B} \cdot t\overrightarrow{B} = 0$$

$$\overrightarrow{B} \cdot (\overrightarrow{C} - \overrightarrow{A}) + \overrightarrow{B} \cdot s\overrightarrow{D} - t = 0$$

$$=> t = \overrightarrow{B} \cdot (\overrightarrow{C} - \overrightarrow{A}) = s\overrightarrow{B} \cdot \overrightarrow{D} \quad (12a)$$

Similarly, $$\overrightarrow{D} \cdot \overrightarrow{mn} = 0$$

$$\overrightarrow{D} \cdot [(\overrightarrow{C} - \overrightarrow{A}) = s\overrightarrow{D} - t\overrightarrow{B}] = 0$$

$$\overrightarrow{D} \cdot (\overrightarrow{C} - \overrightarrow{A}) = \overrightarrow{D} \cdot s\overrightarrow{D} - \overrightarrow{D} \cdot t\overrightarrow{B} = 0$$

$$\overrightarrow{D} \cdot (\overrightarrow{C} - \overrightarrow{A}) + s - \overrightarrow{D} \cdot t\overrightarrow{B} = 0$$

$$=> s = t\overrightarrow{D} \cdot (\overrightarrow{B} - \overrightarrow{D} \cdot (\overrightarrow{C} - \overrightarrow{A}) \quad (12b)$$

Continuing to solve equations (12a) and (12b) for "s" gives:

$$s = \frac{|\overrightarrow{B} \cdot (\overrightarrow{C} - \overrightarrow{A})|(\overrightarrow{D} \cdot \overrightarrow{B}) - \overrightarrow{D} \cdot (\overrightarrow{C} - \overrightarrow{A})}{1 - (\overrightarrow{B} \cdot \overrightarrow{D})^2} \quad (13)$$

Solving equation (13) and then solving equation (12a) gives "s" and "t" for the shortest line segment. Camera target position or subject matter is estimated as the midpoint of segment mn:

$$X_s = \begin{bmatrix} (x_m + x_n)/2 \\ (y_m + y_n)/2 \\ (z_m + z_n)/2 \end{bmatrix} \quad (14)$$

The subject matter 500 position is thus defined within the processing system 440 as XS.

Figure 6:
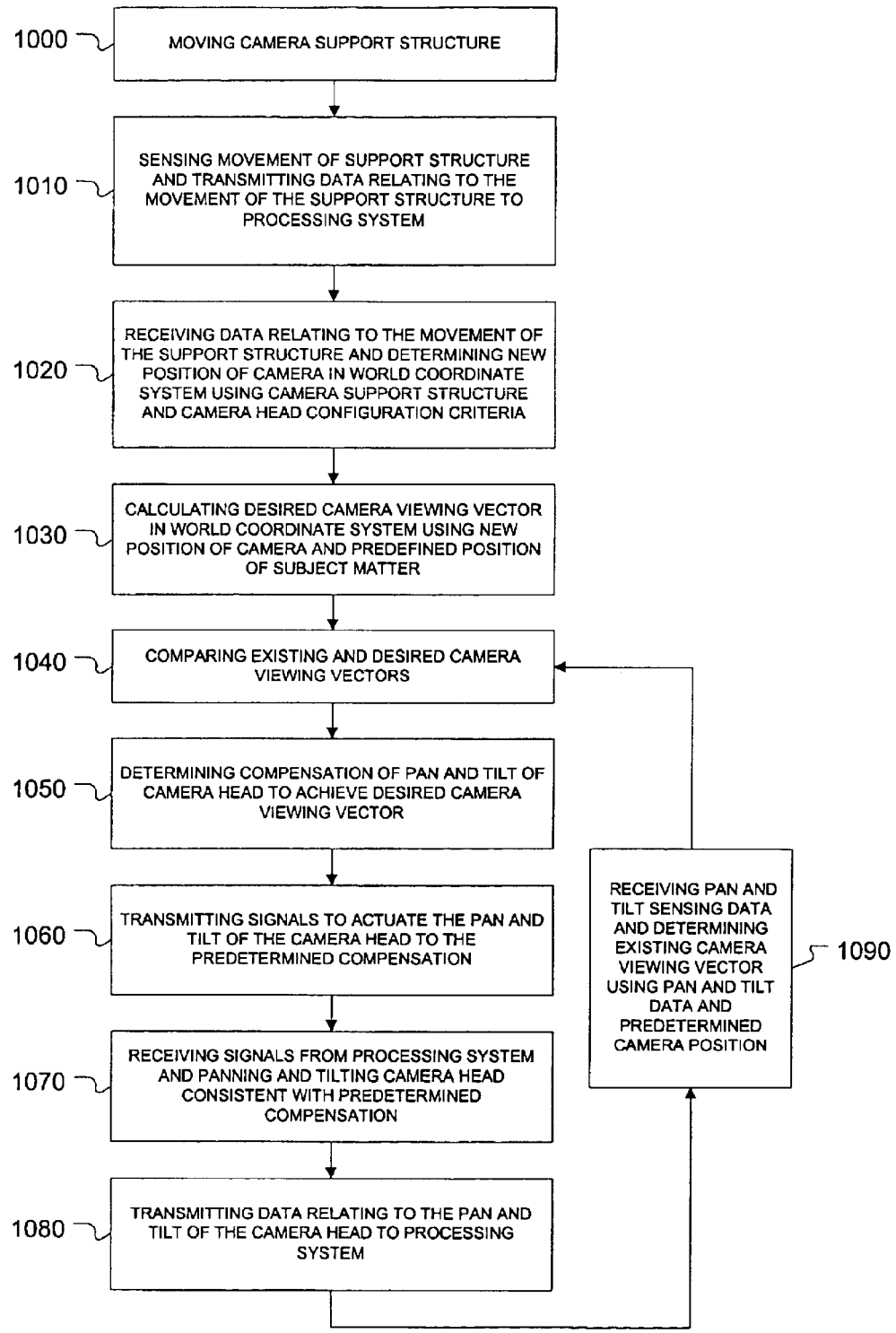
FIG. 6 is a flow chart detailing preferred steps for the compensation of pan and tilt for the movements of a camera support structure in accordance with the preferred automatic pan and tilt compensation control system architecture illustrated in FIGS. 3, 12, and 15.
Figure 12:
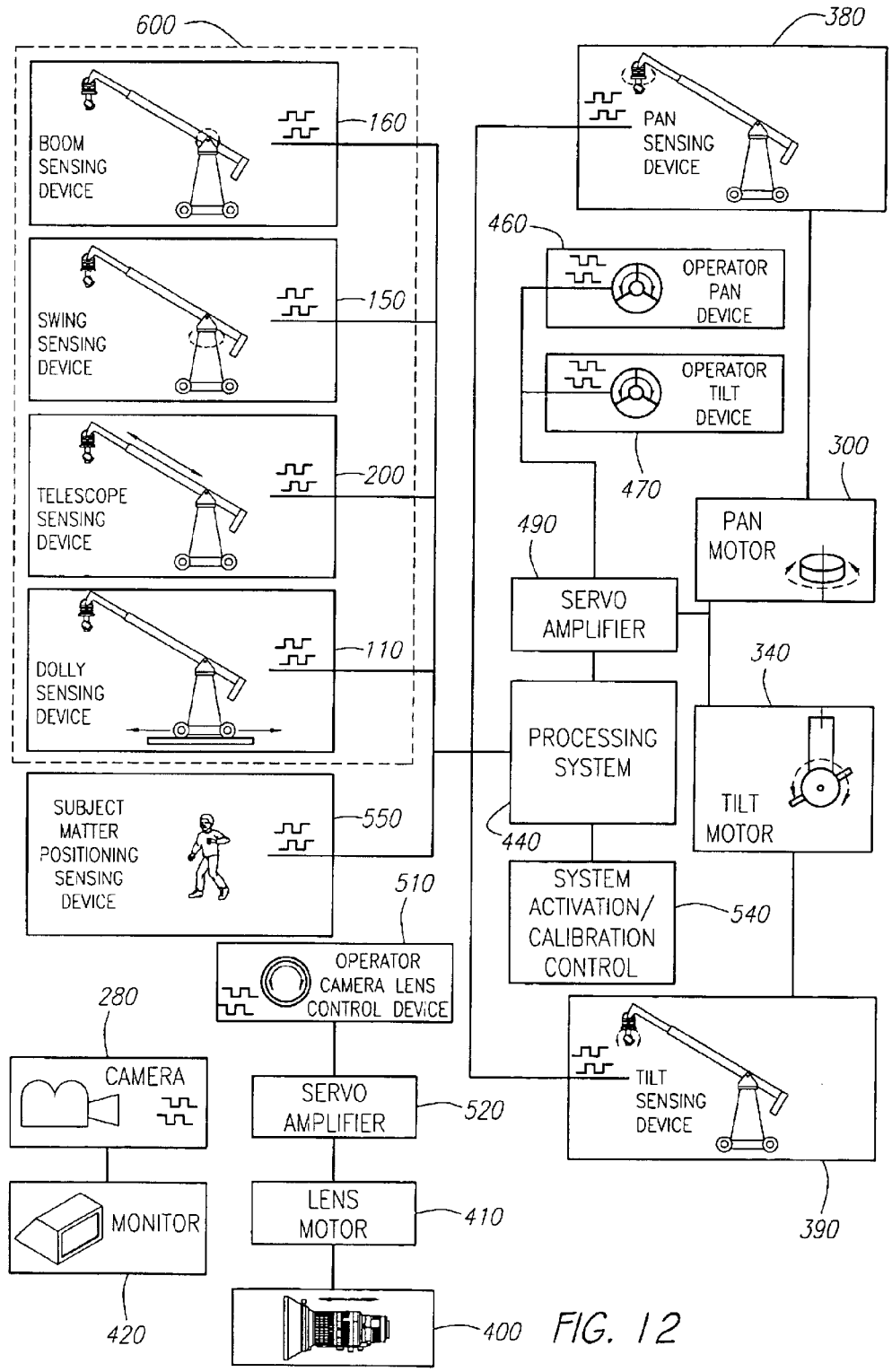
FIG. 12 is a block diagram illustrating a second preferred automatic pan and tilt compensation control system architecture capable of being used in connection with the camera positioning system illustrated in FIG. 1.
Figure 15:
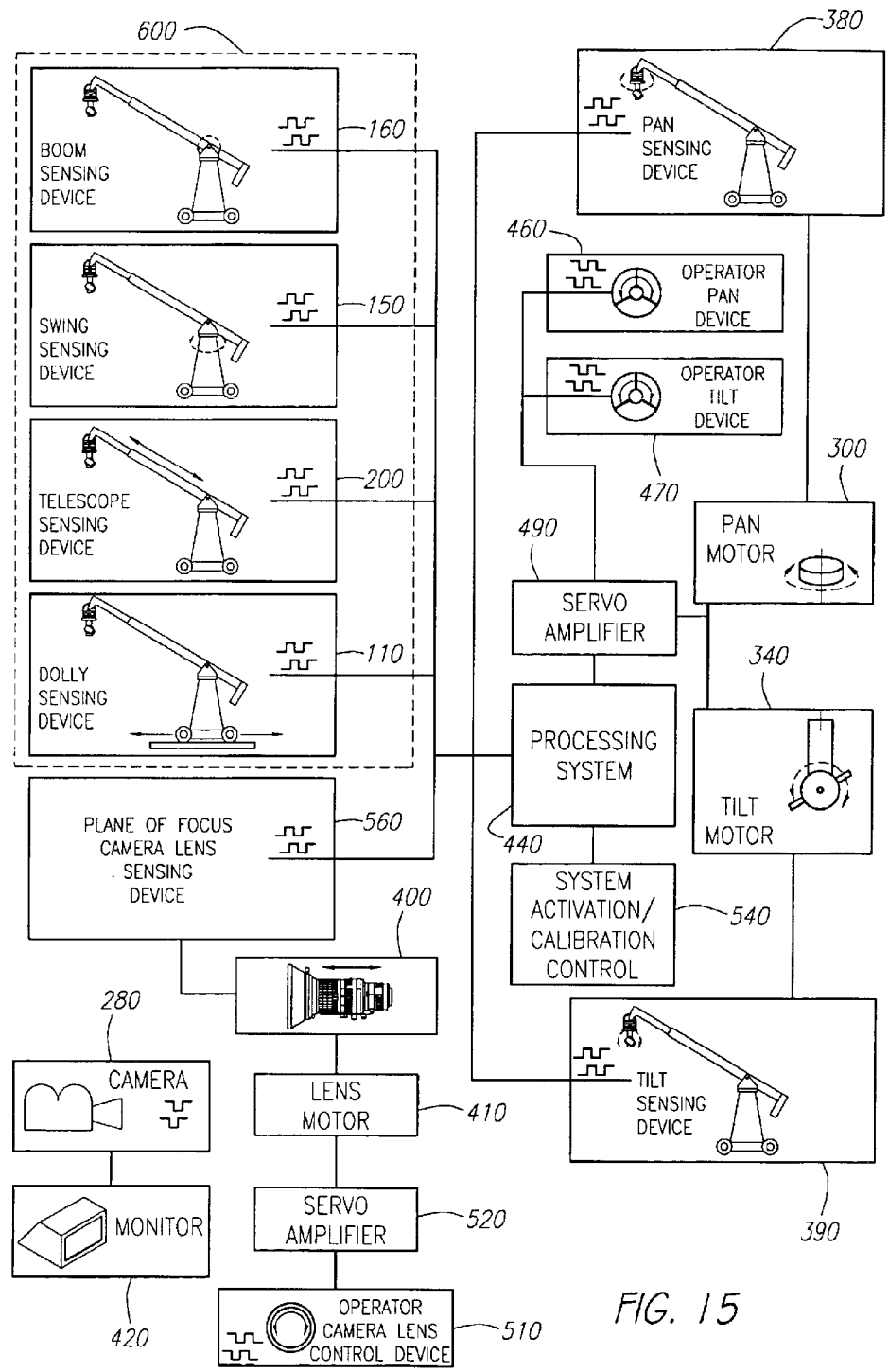
FIG. 15 is a block diagram illustrating a third preferred automatic pan and tilt compensation control system architecture capable of being used in connection with the camera positioning system illustrated in FIG. 1.

FIG. 6 illustrates a flow chart detailing preferred steps for the compensation of pan and tilt for the movements of the camera support structure 20 in accordance with the preferred automatic pan and tilt compensation control system architectures illustrated in FIGS. 3, 12 and 15. As shown in FIG. 6, once movement of the camera support structure 20 occurs (step 1000) the camera support structure sensing device(s) 600 sense movement of the support structure 20 and transmit data relating to the movement of the support structure to the processing system 440 (step 1010). Similar to that of step 730 previously discussed, the processing system 440 receives the data from the camera support structure sensing device(s) 600 and determines from sensor data the new position of the camera in the world coordinate system using camera support structure and camera head configuration criteria (step 1020). The processing system 440 then calculates the desired camera viewing vector in the world coordinate system using the new position of the camera and the predefined position of the subject matter 500 (step 1030). The processing system 440 then compares the existing and desired camera viewing vectors (step 1040) and determines the compensation of pan and tilt of the camera head 270 to achieve the desired camera viewing vector (step 1050). The processing system 440 then sends signals to the servo amplifier 490 to actuate the pan and tilt of the camera head to the predetermined compensation (step 1060). The camera head 270 receives the signals from the processing system 440 and the pan and/or tilt motors, 300, 340 pan and tilt the camera head consistent with the predetermined compensation (step 1070). Employing a standard feed back loop configuration, the pan and tilt sensing devices 380, 390 transmit data to the processing system 440 relating to the pan and tilt of the camera head 270 (step 1080). The processing system 440 receives the data transmitted from the pan and tilt sensing devices 380, 390 and determines the existing camera viewing vector using the pan and tilt sensing device data and the predetermined camera position (step 1090). Steps 1040 through 1090 are repeated until the existing camera viewing vector is the same as the desired camera viewing vector. Pan and tilt compositional adjustments by the camera operator via the operator pan and tilt devices 460, 470 are preferably taken into account in determining the appropriate pan and tilt compensation of the camera head 270.

Figure 7A:
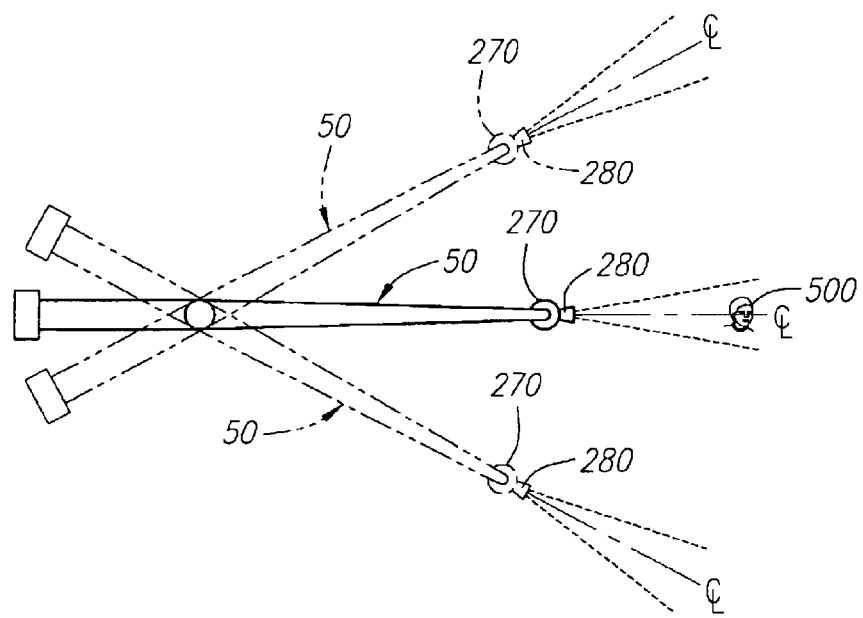
FIG. 7A is a top plan view of a camera support structure depicting the field of view of the camera without camera head pan compensation for changes in the swing angle of the camera crane arm.
Figure 7B:
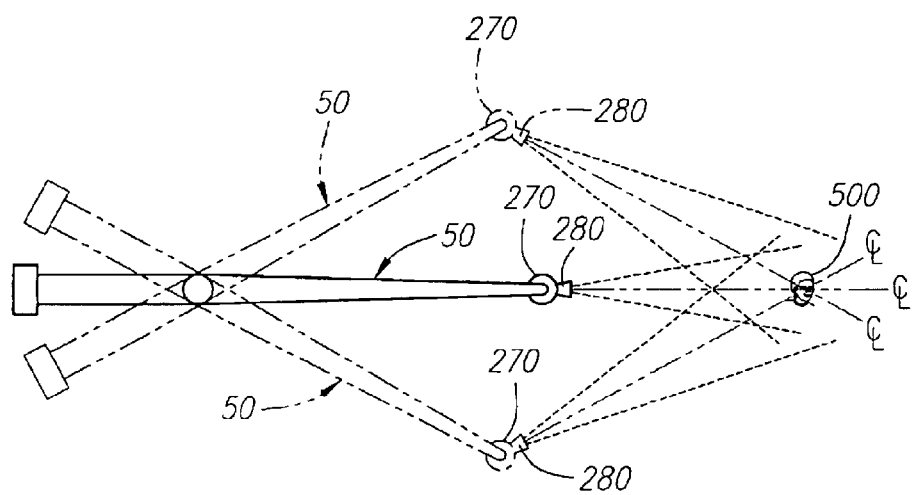
FIG. 7B is a top plan view of a camera support structure depicting the field of view of the camera with camera head pan compensation for changes in the swing angle of the camera crane arm.
Figure 8A:
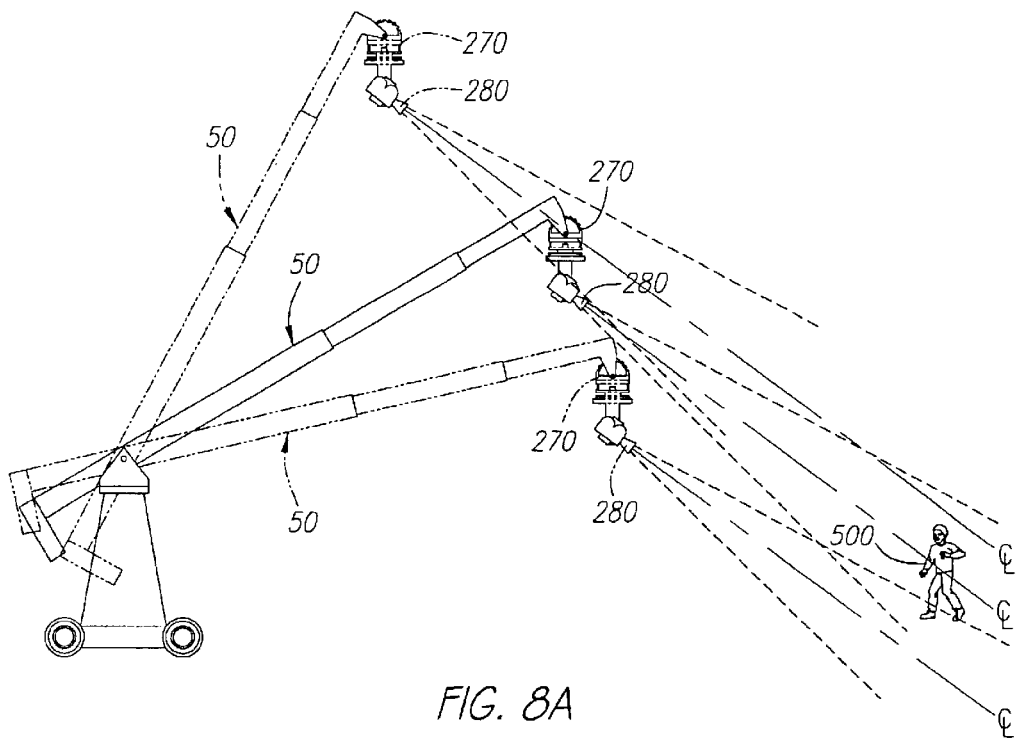
FIG. 8A is a side view of a camera support structure depicting the field of view of the camera without camera head tilt compensation for changes in the boom angle of the camera crane arm.
Figure 8B:
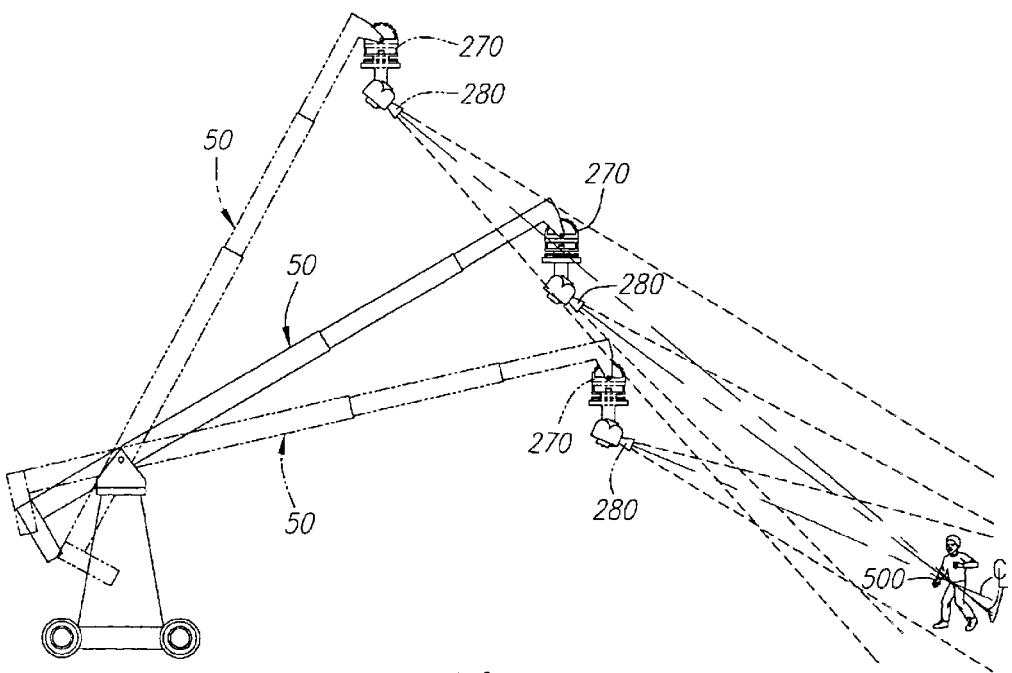
FIG. 8B is a side view of a camera support structure depicting the field of view of the camera with camera head tilt compensation for changes in the boom angle of the camera crane arm.

The operation of the automatic pan and tilt compensation system 10 with respect to movements or change in position of the camera support structure 20 are illustrated in FIGS. 7A and 7B and 8A and 8B. As illustrated in FIG. 7A without automatic pan compensation (e.g., the system is in the unactivated state) for changes in the movement of the camera support structure 20 such as the swing of the camera crane arm 50, the subject matter 500 does not remain centered within the field of view of the camera 280. In contrast, as illustrated in FIG. 7B with automatic pan compensation the centerline of the field of view of the camera 280 remains fixed on the subject matter 500 when the camera support structure 20 moves. Similarly, as illustrated in FIG. 8A without automatic tilt compensation for changes in the movement of the camera support structure 20 such as the boom of the camera crane arm 50, the subject matter 500 does not remain centered within the field of view of the camera 280. In contrast, as illustrated in FIG. 8B with automatic tilt compensation the centerline of the field of view of the camera 280 remains fixed on the subject matter 500 when the camera support structure 20 moves.

Figure 9:
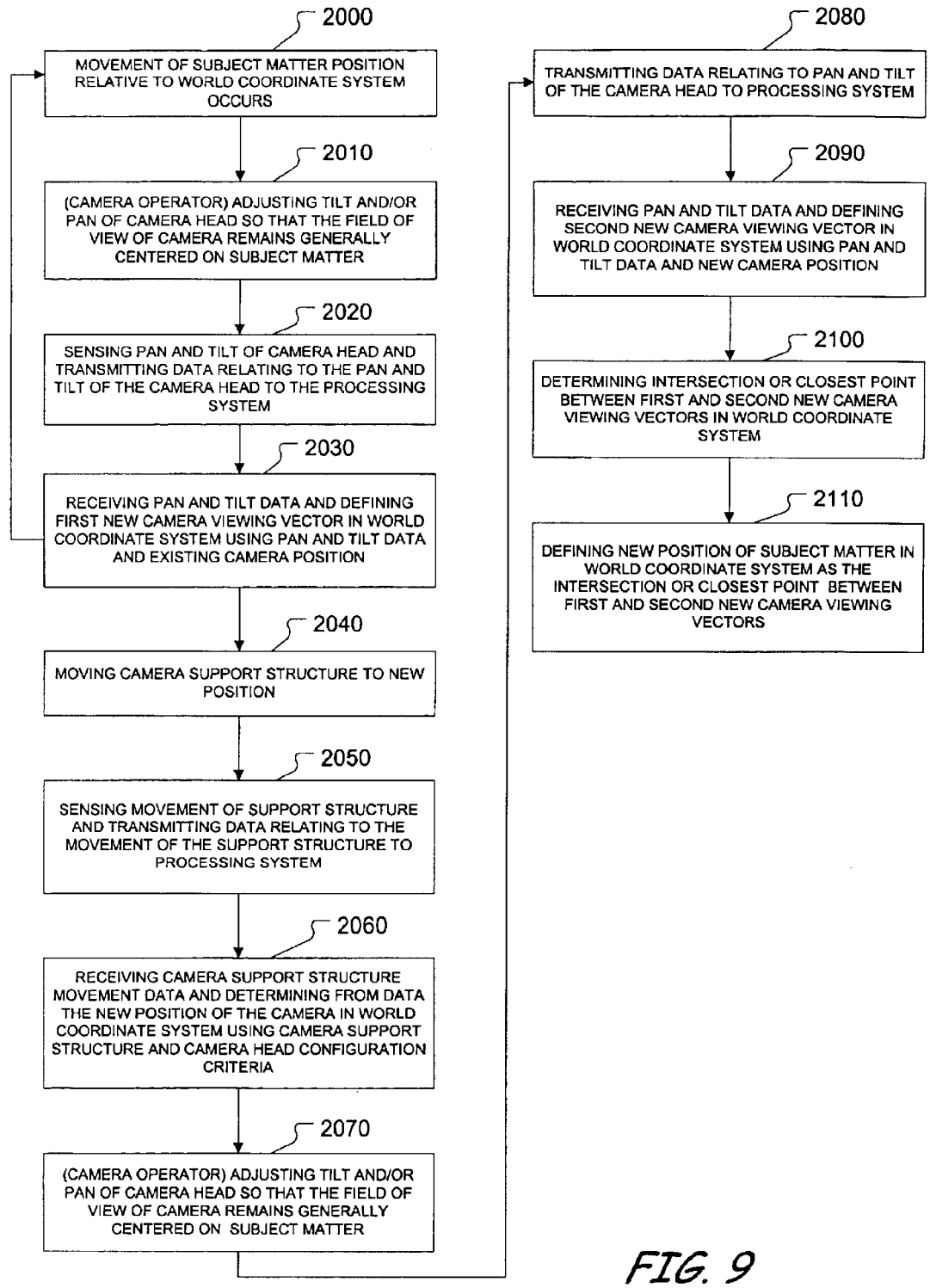
FIG. 9 is a flow chart detailing preferred steps for the compensation of pan and tilt for the movements of a subject matter in accordance with the first preferred automatic pan and tilt compensation control system architecture illustrated in FIG. 3.

FIG. 9 illustrates a flow chart detailing preferred steps for the compensation of pan and tilt for the movements of a subject matter in accordance with the preferred automatic pan and tilt compensation control system architecture illustrated in FIG. 3. As shown in FIG. 9, once the subject matter 500 changes position relative to the world coordinate system (step 2000), the camera-operator adjusts via the camera-operator pan and tilt compensation devices 460, 470 the tilt and/or pan of the camera head 270 so that the field of view of the camera 280 is generally centered on the subject matter 500 (step 2010). After adjustment of the pan and tilt, the camera operator via the system activation/calibration control 540 may in a preferred implementation set or indicate to the processing system 440 that the adjustment of the pan and tilt reflects a change in position or movement of the subject matter 500. Such a preferred implementation may better facilitate the camera operator's pan and tilt adjustments of the camera head 270 for purposes of fashioning the composition of the shot without redefining the position of the subject matter vis-a-vis the processing system 440. The pan and tilt sensing devices 380, 390 transmit data to the processing system 440 relating to the pan and tilt of the camera head 270 (step 2020). The processing system 440 receives the data and defines a first new camera viewing vector in world coordinates system using the data from pan and tilt sensing devices 380, 390 and existing camera position (step 2030). With every change in the subject matter position, steps 2000 through 2030 are repeated and a first new camera viewing vector is calculated. Upon movement of the camera support structure 20 to a new position (step 2040), the camera support structure sensing device(s) 600 senses the movement of the support structure 20 and transmits data relating to the movement of the support structure 20 to the processing system 440 (step 2050). Similar to step 730, the processing system receives the movement data from the support structure sensing device(s) 600 and determines from the sensor data the new position of the camera 280 in world coordinate system using camera support structure 20 and camera head 270 configuration criteria (step 2060). The camera-operator again adjusts via the camera-operator pan and tilt compensation devices 460, 470 the pan and tilt of the camera head 270 so that the field of view of the camera 280 is generally centered on the subject matter 500 (step 2070). This step is similar to that of step 740. Also, in similar fashion as that previously described, after the support structure 20 is positioned at the new calibration position and the pan and tilt is adjusted by the camera operator, the camera operator via the system activation/calibration control 540 may in a preferred implementation set the new calibration position in the processing system 440 thereby affirmatively identifying the new calibration position for employment by the processing system 440. The pan and tilt sensing devices 380, 390 transmit position data relating to the pan and tilt of the camera head 270 to the processing system 440 (step 2080) which then defines the second new camera viewing vector in world coordinate system using the data from the pan and tilt sensing devices 380, 390 and the new camera position (step 2090). Once the processing system 440 has calculated the first and second new camera viewing vectors, the processing system 440 determines the intersection or closest point between first and second new camera viewing vectors in world coordinates system (step 2100) and defines the new position of the subject matter 500 as the intersection or closest point between the first and second new camera viewing vectors (step 2110). The new subject matter 500 position is now defined within the processing system 440 and is used in step 1030 in calculating the desired camera viewing vector for the movements of the camera support structure as previously described in relation to FIG. 6.

Figure 10A:
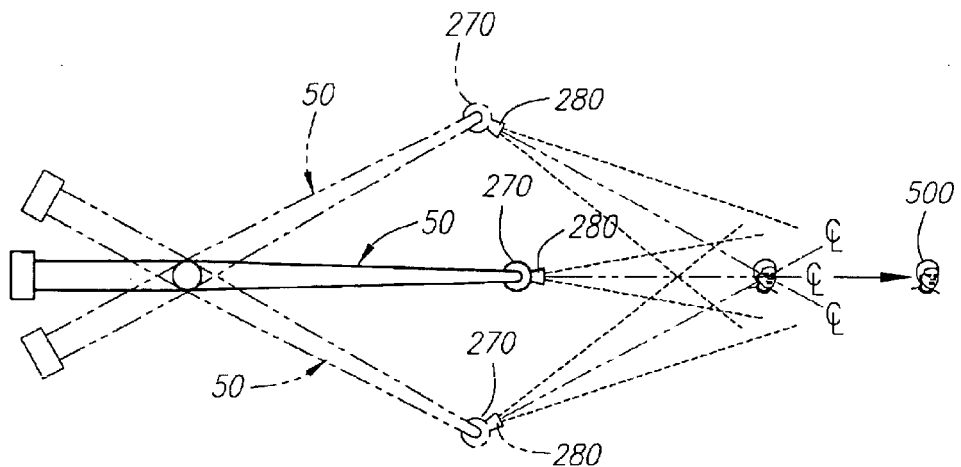
FIG. 10A is a top plan view of a camera support structure depicting the field of view of the camera with camera head pan compensation for changes in the swing angle of the camera crane arm but without camera head pan compensation for the movements of a subject matter.
Figure 10B:
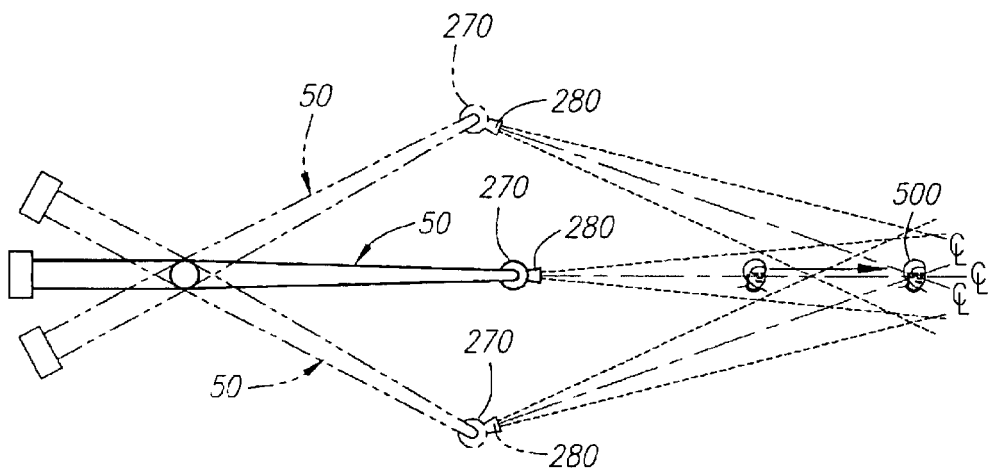
FIG. 10B is a top plan view of a camera support structure depicting the field of view of the camera with camera head pan compensation for the movements of a subject matter and for changes in the swing angle of the camera crane arm.
Figure 11A:
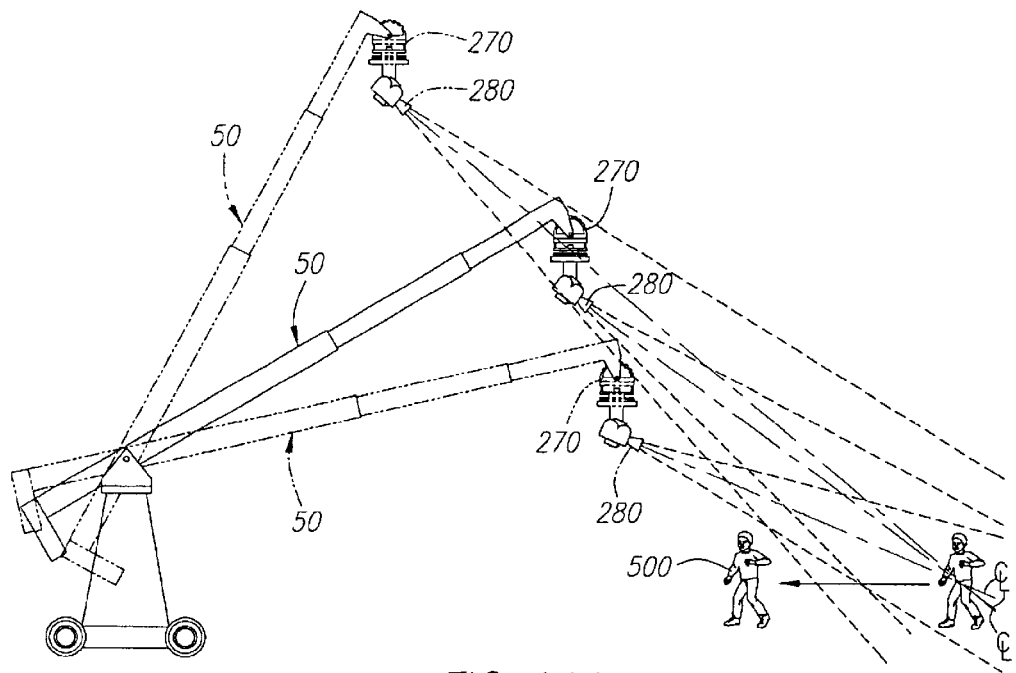
FIG. 11A is a side view of a camera support structure depicting the field of view of the camera with camera head tilt compensation for changes in the boom angles of the camera crane arm but without camera head tilt compensation for the movements of a subject matter.
Figure 11B:
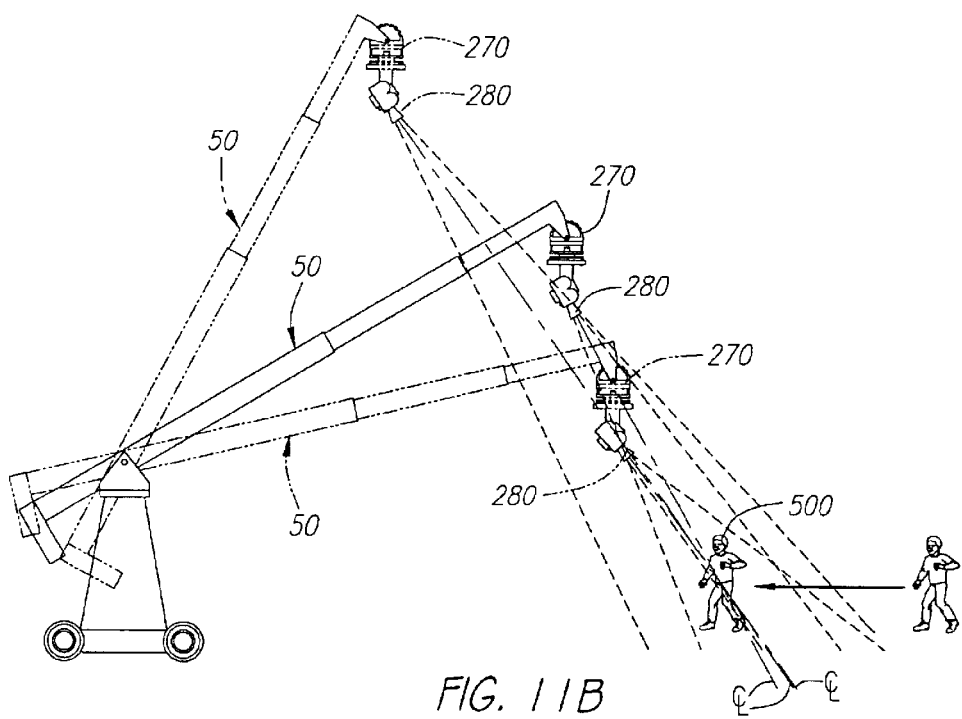
FIG. 11B is a side view of a camera support structure depicting the field the view of the camera with camera head tilt compensation for the movements of a subject matter and for changes in the boom angle of the camera crane arm.

The operation of the automatic pan and tilt compensation system 10 with respect to movements of the subject matter 500 are illustrated in FIGS. 10A and 10B and 11A and 11B. As illustrated in FIG. 10A without automatic pan compensation for changes in the movement of the subject matter 500, when the camera crane arm 50 swings, the subject matter 500 at its new position does not remain centered within the field of view of a camera 280. In contrast, as illustrated in FIG. 10B with automatic pan compensation the field of view of the camera 280 remains centered on the new position of the subject matter 500 when the camera support structure 20 moves. Similarly, as illustrated in FIG. 11A without automatic tilt compensation for changes in the movement of the subject matter 500, when the camera crane arm 50 boom changes, the subject matter 500 does not remain centered within the field of view of a camera 280. In contrast, as illustrated in FIG. 11B with automatic tilt compensation the field of view of the camera 280 remains centered on the new position of the subject matter 500 when movement in the camera support structure 20 occurs.

FIG. 12 is a block diagram illustrating a second preferred automatic pan and tilt compensation control system architecture capable of being used in connection with the camera positioning system illustrated in FIG. 1. The description of the diagram of FIG. 12 is substantially the same as that of FIG. 3 with one primary difference. A subject matter positioning sensing device 550 (also shown in phantom in FIG. 1) monitors the position or movement of the subject matter 500 and communicates information relating to the movement/position of the subject matter 500 to the processing system 440 via suitable communications means. The subject matter positioning sensing device 550 may be comprised of a device that is capable of providing data regarding the position or movement of the subject matter relative to a defined coordinate system. For example, the positioning sensing device may be comprised of a GPS device, such as a GPS TracPak manufactured by GARMIN International, Inc. of Olathe, Kans., or a laser positioning device such as a Vulcan manufactured by ArcSecond, Inc. of Dulles, Va., or perhaps a radar device.

Figure 13:
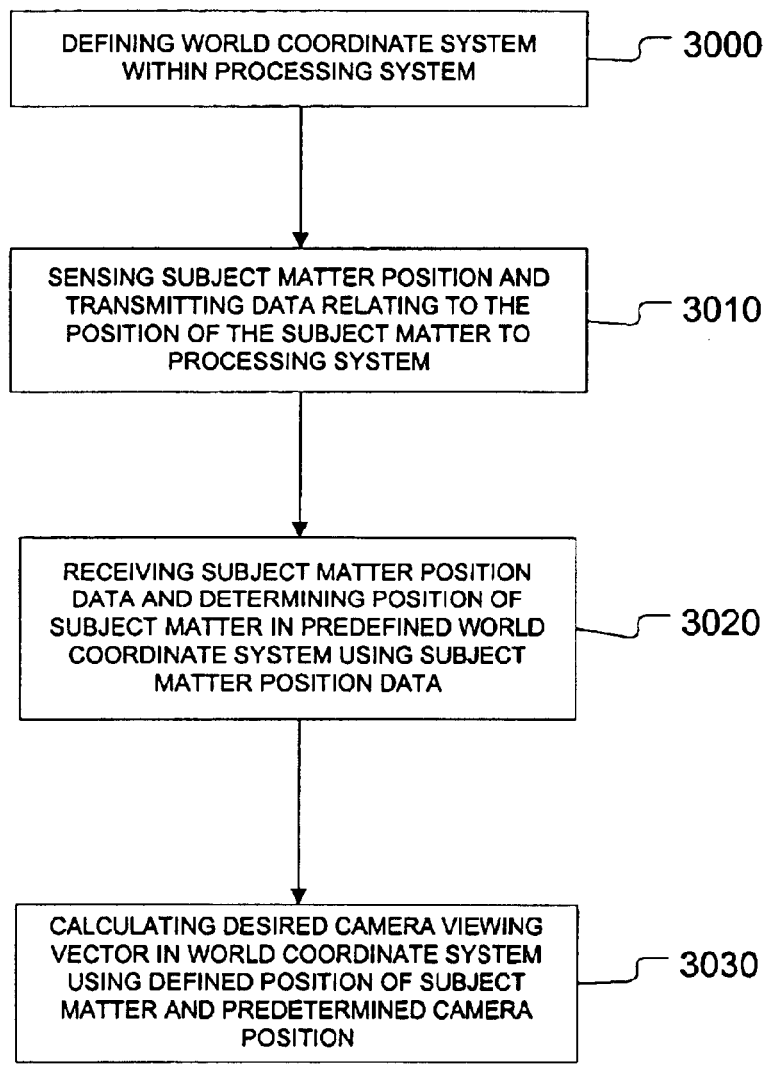
FIG. 13 is a flow chart detailing preferred steps for defining the position of a subject matter relative to a defined world coordinate system in accordance with the second preferred automatic pan and tilt compensation control system architecture illustrated in FIG. 12.

FIG. 13 illustrates a flow chart detailing preferred steps for defining the position of a subject matter relative to the defined world coordinate system in accordance with the second preferred automatic pan and tilt compensation control system architecture illustrated in FIG. 12. As shown in FIG. 13, defined within the processing system 440, as in step 700, is the world coordinate system (step 3000). Once defined, the subject matter positioning sensing device 550 sends data to the processing system 440 relating to the position of the subject matter 500 (step 3010). The processing system 440 receives the signals from the subject matter positioning device 550 and correlates or determines from the data the position of the subject matter 500 in relation to the predefined world coordinate system (step 3020). It is to be understood that the determination of the subject matter 500 need not be the exact physical position of the subject matter sensing device 550, but rather may be offset a defined distance and direction from the sensing device 550. For example, if the subject matter 500 is a person, the sensing device may be located in a purse carried by the person, yet the operative subject matter 500 would nonetheless be correlated to the person. This may facilitate additional versatility in the placement of the subject matter sensing device 550. After step 3020, the processing system 440 calculates the desired camera viewing vector in world coordinate system using the newly defined position of the subject matter 500 and the predetermined camera position (step 3030), which is determined by the processing system 440 from the sensing device(s) 600 data with reference to the camera support structure 20 and camera head 270 configuration criteria as previously described. The new subject matter 500 position is now defined within the processing system 440 and is used in step 1030 in calculating the desired camera viewing vector for the movements of the camera support structure 20 as previously described in relation to FIG. 6.

Figure 14:
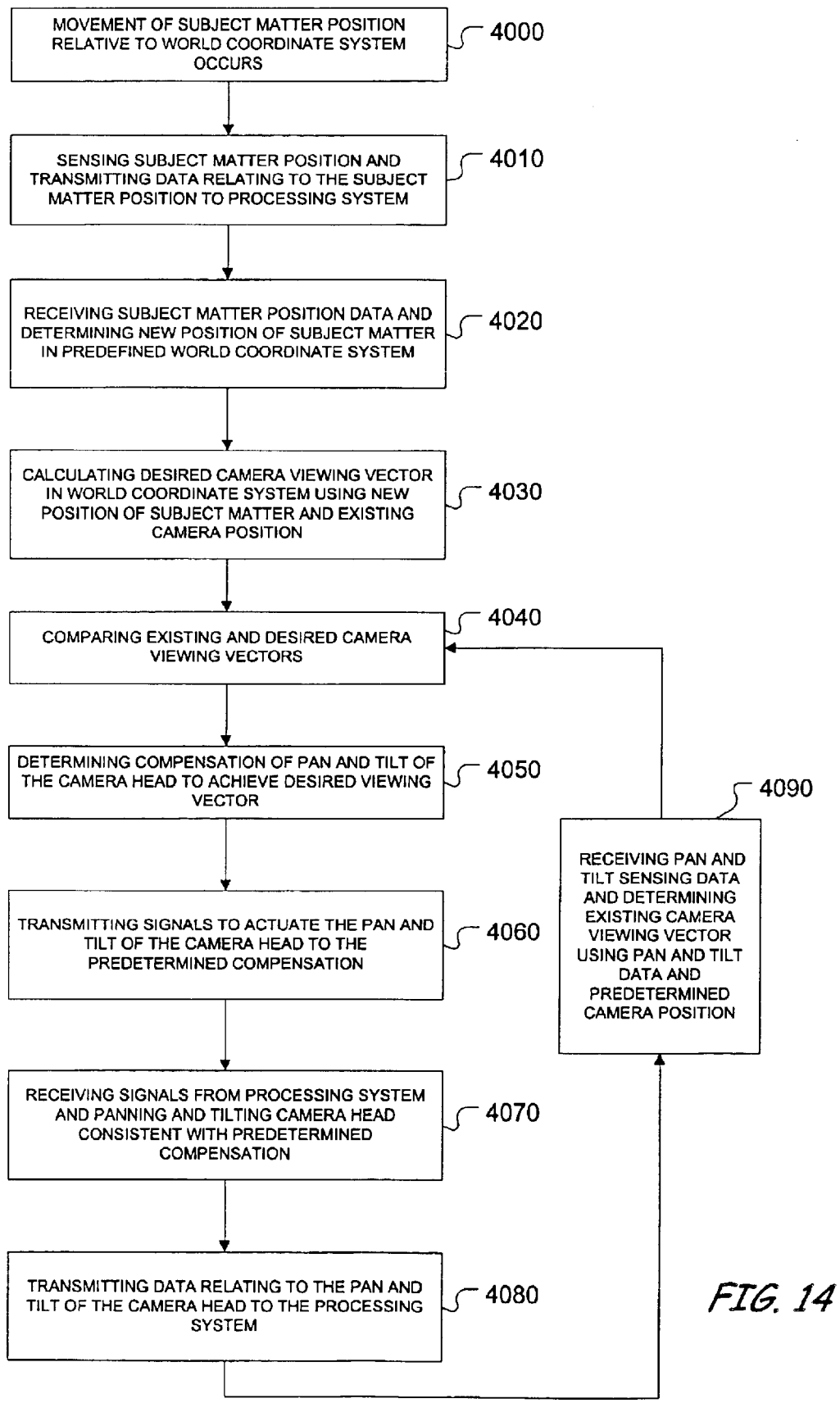
FIG. 14 is a flow chart detailing preferred steps for the compensation of pan and tilt for the movements of a subject matter in accordance with the second preferred automatic pan and tilt compensation control system architecture illustrated in FIG. 12.

FIG. 14 illustrates a flow chart detailing preferred steps for the compensation of pan and tilt for the movements of a subject matter in accordance with the second preferred automatic pan and tilt compensation control system architecture illustrated in FIG. 12. As shown in FIG. 14, once the subject matter 500 moves or changes position relative to the world coordinate system (step 4000), the subject matter position sensing device 550 sends signals to the processing system 440 relating to the new position of the subject matter 500 (step 4010). The processing system 440 receives the signals from the subject matter positioning sensing device 550 and determines new position of the subject matter 500 in predefined world coordinate system (step 4020) and calculates the desired camera viewing vector in world coordinate system using the new position of the subject matter 500 and the existing position of the camera 280 (step 4030), which is determined by the processing system 440 from the sensing device(s) 600 data with reference to the camera support structure 20 and camera head 270 configuration criteria as previously described. The remaining steps 4040 to 4090 are similar to steps 1040 through 1090 previously described in relation to FIG. 6. Namely, the processing system 440 then compares the existing and desired camera viewing vectors (step 4040) and determines the compensation of pan and tilt of the camera head 270 to achieve the desired camera viewing vector (step 4050). The processing system 440 then sends signals to the servo amplifier 490 to actuate the pan and tilt of the camera head to the predetermined compensation (step 4060). The camera head 270 receives the signals from the processing system 440 and the pan and/or tilt motors, 300, 340 pan and tilt the camera head consistent with the predetermined compensation (step 4070). Employing a standard feed back loop configuration, the pan and tilt sensing devices 380, 390 transmit data to the processing system 440 relating to the pan and tilt of the camera head 270 (step 4080). The processing system 440 receives the data transmitted from the pan and tilt sensing devices 380, 390 and determines the existing camera viewing vector using the pan and tilt sensing device data and the predetermined camera position (step 4090). Steps 4040 through 4090 are repeated until the existing camera viewing vector is consistent with the desired camera viewing vector. It is to be understood that this system architecture may be employed to automatically compensate the pan and tilt of a camera head for the movements of a subject matter 500 without need of movement of the camera support structure 20 or additional input by the camera operator to define the new position of the subject matter within the system. Thus, it is contemplated that this system architecture may be employed for stationary camera support structures as well as for camera support structures capable of movement with one or more degrees of freedom.

It is further contemplated that one or more subject matter sensing devices may be employed. For example, there may be multiple subjects being filmed in which one or more of the subjects may each be monitored by a subject matter positioning sensing device 550. How the data from the multiple subject matter positioning sensing devices 550 is correlated within the processing system 440 is a matter of design choice. For example, the position of the subject matter defined in the processing system 440 for purposes of panning and tilting the camera head may be defined by the position of a single subject matter or it may be defined as a weighted average or mid-point between multiple subject matters. Moreover, the system may be designed to simultaneously or intermittently track one or more subject matters 500 and allow the user or camera operator to determine at any given time during or prior to filming which subject matter 500 the system is to "track" or compensate the pan and tilt of the camera head for.

FIG. 15 is a block diagram illustrating a third preferred automatic pan and tilt compensation control system architecture capable of being used in connection with the camera positioning system illustrated in FIG. 1. The description of the diagram of FIG. 15 is substantially the same as that of FIG. 3 with one primary difference. A plane of focus camera lens sensing device 560 (shown in FIG. 2) is employed to monitor the plane of focus of the camera lens 400 and communicate information relating to the plane of focus of the camera lens 400 to the processing system 440 via suitable communications means. In the preferred embodiment illustrated in FIGS. 1 and 2, the camera lens plane of focus sensing device 560 may be comprised of device that is capable of providing data relating to the distance from the camera lens in which the camera lens 400 is in optimum focus such as a Panatape ultrasonic based device manufactured by Panavision Corporation of the United States of America, which monitors the drive mechanism of the lens motor 410 and transmits electrical signals relating to the plane of focus of the camera lens 400 to the processing system 440 via electrical cable 530.

Figure 16:
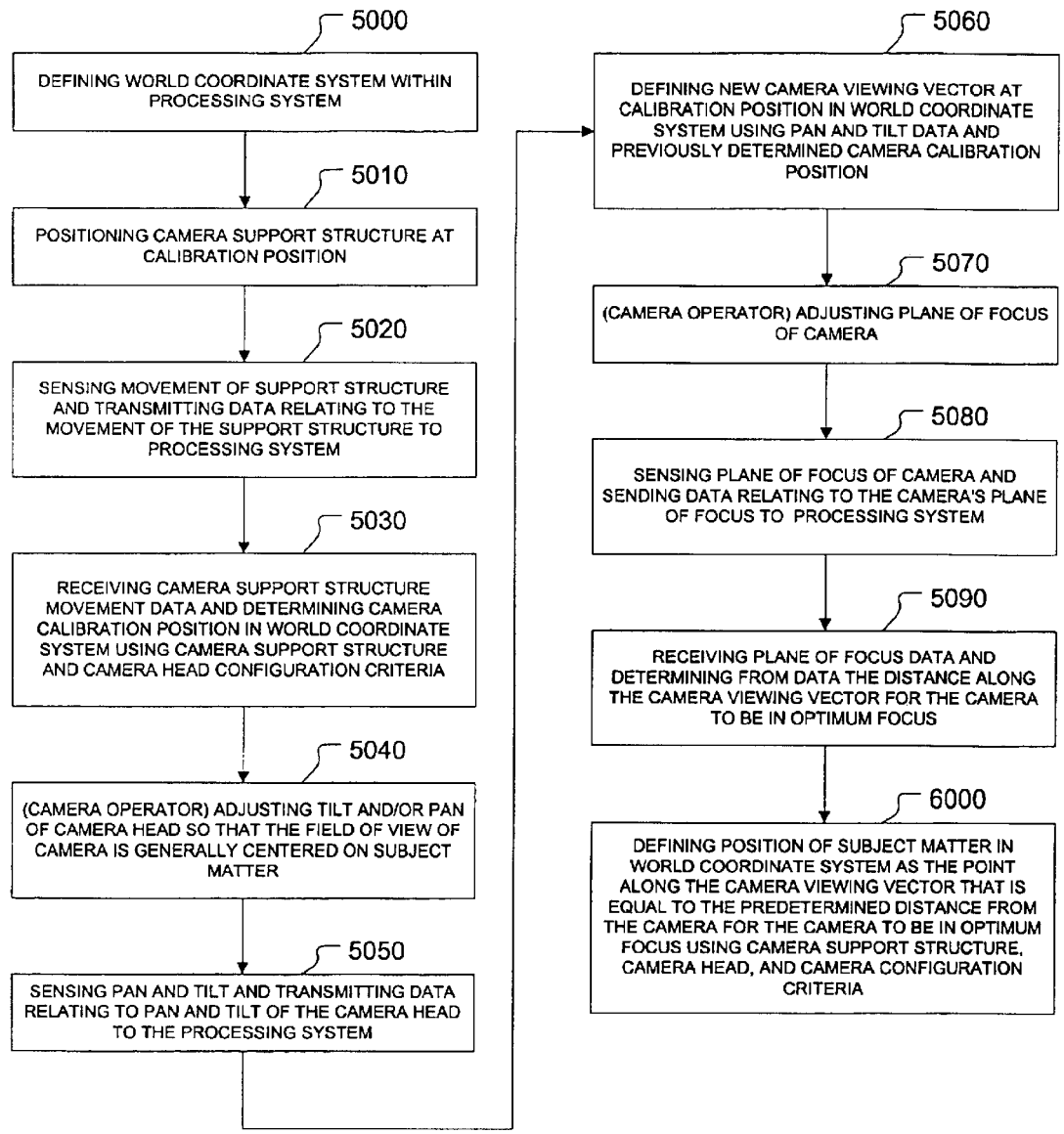
FIG. 16 is a flow chart detailing preferred steps for defining the position of a subject matter relative to a defined world coordinate system in accordance with the third preferred automatic pan and tilt compensation control system architecture illustrated in FIG. 15.

FIG. 16 illustrates a flow chart detailing preferred steps for defining the position of a subject matter relative to the defined world coordinate system in accordance with the third preferred automatic pan and tilt compensation control system architecture illustrated in FIG. 15. Many of the initial steps set forth in FIG. 16 are analogous with the initial steps illustrated and described in relation with FIG. 4. The later steps are different in that the plane of focus sensing device 560 removes the need to add a second camera calibration position as described in relation with FIG. 4. As shown in FIG. 16, defined within the processing system 440 is the world coordinate system (step 5000). Once defined, the camera support structure 20 is positioned at a calibration position (step 5010). The camera support structure sensing device(s) 600 senses movement, if any, (e.g., change in boom, swing, telescope, dolly) of the support structure 20 and transmits data relating to the movement of the support structure 20 to the processing system 440 (step 5020). The processing system 440 receives movement data from the camera support structure sensing device(s) 600 and determines from the data, as in step 730, the camera calibration position using camera support structure 20 and camera head 270 configuration criteria (step 5030). Once the camera support structure 20 is positioned at the calibration position, the camera-operator adjusts the pan and tilt of the camera head 270 via the camera-operator pan and tilt compensation devices 460, 470 so that the field of view of the camera is generally-centered on the subject matter 500 (step 5040). The pan and tilt sensing devices 380, 390 transmit to the processing system 440 data relating to the pan and tilt of the camera head 270 (step 5050). The processing system 440 receives the data from the pan and tilt sensing devices 380, 390 and defines an initial camera viewing vector (called out as 900 in FIG. 5) for the calibration position in the world coordinate system using data from pan and tilt sensing devices 380, 390 and previously determined calibration position (step 5060). As was previously described, after the support structure 20 is positioned at the first calibration position, the camera operator via the system activation/calibration control 540 may in a preferred implementation set the calibration position in the processing system 440 and thereby affirmatively identify the calibration position that the operator wishes the processing system 440 to employ.

Unlike the steps set forth in relation to FIG. 4, rather than the camera support structure 20 being positioned at a second calibration position and the process repeated (i.e., steps 770–825 of FIG. 4), the camera-operator instead adjusts the plane of focus for the camera 280 via the remote camera lens control device 510 (step 5070). The plane of focus camera sensing device 560 sends data relating to the camera's plane of focus to the processing system 440 (step 5080). The processing system 440 receives the plane of focus data and determines from the data the distance along the camera viewing vector (e.g., vector 900 illustrated in FIG. 5) for the camera 280 to be optimally focused (step 5090). Upon adjustment of the plane of focus of the lens, the camera operator via the system activation/calibration control 540 may in a preferred implementation set the calibration of the plane of focus in the processing system 440 and thereby affirmatively define the calibration plane of focus that the operator wishes the processing system 440 to employ. Such a preferred implementation may further facilitate the camera operators control in fashioning the desired composition of the shot without redefining the position of the subject matter 500 vis-a-vis the processing system 440. Lastly, the processing system 440 defines the position of the subject matter 500 in the world coordinate system as the point along the camera viewing vector equal to the predetermined distance from the camera 280 for the camera to be in optimum focus using camera support structure 20, camera head 270, and camera 280 configuration criteria (step 6000). The subject matter 500 position is now defined within the processing system 440 and may be used in step 1030 in calculating the desired camera viewing vector for the movements of the camera support structure 20 as previously described in relation to FIG. 6.

Figure 17:
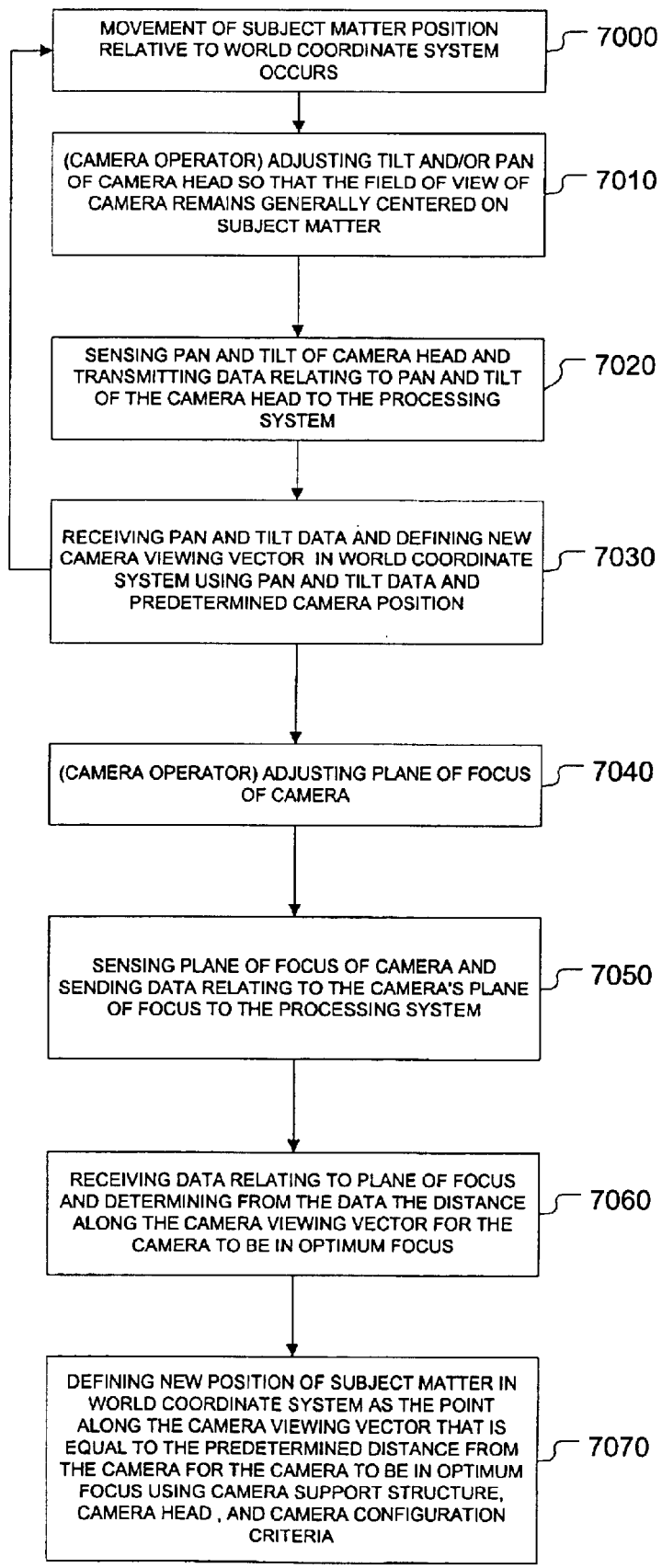
FIG. 17 is a flow chart detailing preferred steps for the compensation of pan and tilt for the movements of a subject matter in accordance with the third preferred automatic pan and tilt compensation control system architecture illustrated in FIG. 15.

FIG. 17 illustrates a flow chart detailing preferred steps for the compensation of pan and tilt for the movements of a subject matter in accordance with the third preferred automatic pan and tilt compensation control system architecture illustrated in FIG. 15. Many of the initial steps set forth in FIG. 17 are analogous with the initial steps illustrated and described in relation with FIG. 9 of the first preferred control system architecture. The later steps are different in that the plane of focus sensing device 560 removes the need for the camera support structure 20 to be moved to a new position prior to the processing system 440 determining the new position of the subject matter 500. As shown in FIG. 17, once the subject matter 500 changes position relative to the world coordinate system (step 7000), the camera-operator adjusts the tilt and/or pan of the camera head 270 via the camera-operator pan and tilt compensation devices 460, 470 so that the field of view of the camera 280 is generally centered on the subject matter 500 (step 7010). As was previously described, after adjustment of the pan and tilt, the camera operator via the system activation/calibration control 540 may in a preferred implementation set or indicate to the processing system 440 that the adjustment of the pan and tilt reflects a change in position or movement of the subject matter 500. Such a preferred implementation may better facilitate the camera operator's pan and tilt adjustments of the camera head 270 for purposes of fashioning the composition of the shot without redefining the position of the subject matter vis-a-vis the processing system 440. The pan and tilt sensing devices 380, 390 transmit data to the processing system 440 relating to the pan and tilt of the camera head 270 (step 7020). The processing system 440 receives the data and defines a new camera viewing vector with respect to the world coordinates system using the data from pan and tilt sensing devices 380, 390 and existing camera position (step 7030). With every change in the subject matter's position, steps 7000 through 7030 are repeated and the new camera viewing vector is calculated. Upon movement of the subject matter 500 to a new position (step 7000), the camera-operator adjusts the plane of the camera 280 if necessary via the remote camera lens control means 510 (step 7040). As was previously described, upon adjustment of the plane of focus of the lens, the camera operator via the system activation/calibration control 540 may in a preferred implementation set the calibration of the plane of focus in the processing system 440 and thereby affirmatively define the calibration plane of focus that the operator wishes the processing system 440 to employ. Such a preferred implementation may further facilitate the camera operators control in fashioning the desired composition of the shot without redefining the position of the subject matter 500 vis-a-vis the processing system 440. The plane of focus camera sensing device 560 sends data relating to the camera's plane of focus to the processing system 440 (step 7050). The processing system 440 receives the data relating to the plane of focus and determines from the data the distance along the newly determined camera viewing vector for the camera 280 to be in optimum focus (step 7060). The processing system 440 then defines the new position of the subject matter 500 in the world coordinate system as the point along the new camera viewing vector that is equal to the predetermined distance from the camera 280 for the camera to be in optimum focus using camera support structure 20, camera head 270, and camera 280 configuration criteria (step 7070). The new subject matter 500 position is now defined within the processing system 440 and is used in step 1030 in calculating the desired camera viewing vector for the movements of the camera support structure 20 as previously described in relation to FIG. 6.

It is noted that each of the preferred automatic pan and tilt compensation control system architectures include overlapping architecture components. Consequently, it is contemplated that the preferred steps relating to the first preferred automatic pan and tilt compensation control system architecture may also be employed with respect to the second and third preferred automatic pan and tilt compensation control system architectures. For example, the preferred steps described in relation to FIG. 4 may be substituted for the corresponding preferred steps described in relation to FIGS. 13 and 16 of the second and third preferred control system architectures.

Furthermore, it is to be understood that the automatic pan and tilt compensation control system architectures disclosed herein are also capable of being implemented with a gyro stabilized camera head. In such an implementation the, compensation of the gyro stabilized head is taken into account in determining the appropriate compensation of the camera head 270 for the movements of the support structure 20 and/or subject matter 500.

It is further noted that an additional advantage of the automatic pan and tilt compensation system disclosed herein is its ability to obtain as an end product meta-data relating to the orientation of the camera, camera head, and support structure during a given shot in preferably 3-dimensional space relative to a defined or fixed coordinate system. Such meta-data has particular utility in integrating the shot with computer graphics or other special effects as well as having considerable usefulness in other processing and editing tasks.

While there has been illustrated and described what are at present considered to be preferred embodiments, features and methods of the present invention, it will be understood by those skilled in the art that various changes and modifications may be made, and equivalents may be substituted for elements thereof without departing from the scope of the invention.

In addition, many modifications may be made to adapt a particular, element, feature or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed:

1. An automated camera head pan and tilt compensation system comprising:
    a camera support structure configured to be capable of movement with multiple degrees of freedom;
    a camera head coupled to the camera support structure and adapted to pan and tilt;
    a camera support structure sensing means configured to monitor and transmit via suitable communication means data relating to movement of the camera support structure; and
    a processing system configured to receive and process the data from the camera support structure sensing means and transmit signals to pan and tilt the camera head to compensate for movements of the camera support structure so that after an initial position of a subject matter is defined, a camera when mounted to the camera head can be moved freely around a set during filming while maintaining its field of view generally centered on a position of a subject matter defined within the processing system without a need to rehearse camera movements prior to filming and pre-record positions that the camera is expected to take during filming.

2. An automated camera head pan and tilt compensation system according to claim 1 further comprising a subject matter sensing means configured to monitor and transmit data relating to movement of a subject matter, wherein the processing system is configured to receive and process the data from the subject matter position sensing means and transmit signals to pan and tilt the camera head to compensate for changes in position of the subject matter.

3. An automated camera head pan and tilt compensation system according to claim 2, wherein the subject matter sensing means includes a global positioning device.

4. An automated camera head pan and tilt compensation system according to claim 2 further comprising means by which the compensation of tilt and pan of the camera head may be adjusted by a user.

5. An automated camera head pan and tilt compensation system according to claim 1, wherein the camera support structure includes a crane arm mounted to a crane arm support structure via a coupling mechanism configured to facilitate rotation of the crane arm about a vertical and horizontal axis relative to the crane arm support structure.

6. An automated camera head pan and tilt compensation system according to claim 5, wherein the camera support structure includes a movable platform to which the crane arm support structure is secured.

7. An automated camera head pan and tilt compensation system according to claim 6, wherein the camera support structure sensing means includes a means for sensing movement of the movable platform.

8. An automated camera head pan and tilt compensation system according to claim 7, wherein the means for sensing movement of the movable platform includes a rotary encoder.

9. An automated camera head pan and tilt compensation system according to claim 5, wherein the camera support structure includes a leveling head coupling the crane arm to the camera head, wherein the leveling head includes a leveling mechanism configured to maintain a defined member parallel to a defined plane in response to changes in rotation of the crane arm about the horizontal axis.

10. An automated camera head pan and tilt compensation system according to claim 5, wherein the camera support structure sensing means includes a means for sensing rotation of the crane arm about the horizontal axis.

11. An automated camera head pan and tilt compensation system according to claim 10, wherein the means for sensing rotation of the crane arm about the horizontal axis includes a rotary encoder.

12. An automated camera head pan and tilt compensation system according to claim 5, wherein the camera support structure sensing means includes a means for sensing the rotation of the crane arm about the vertical axis.

13. An automated camera head pan and tilt compensation system according to claim 12, wherein the means for sensing rotation of the crane arm about the vertical axis includes a rotary encoder.

14. An automated camera head pan and tilt compensation system according to claim 5, wherein the crane arm is configured to be adjustable in length.

15. An automated camera head pan and tilt compensation system according to claim 14, wherein the camera support structure sensing means includes a means for sensing changes in length of the crane arm.

16. An automated camera head pan and tilt compensation system according to claim 15, wherein the means for sensing changes in length of the crane arm includes a rotary encoder.

17. An automated camera head pan and tilt compensation system according to claim 1, wherein the position of a subject matter defined within the processing system is defined in three-dimensional space relative to a predefined coordinate system.

18. An automated camera head pan and tilt compensation system according to claim 1, wherein the suitable communication means includes electrical communications transmitted through an electrical cable.

19. An automated camera head pan and tilt compensation system according to claim 1 further comprising means by which the compensation of tilt and pan of the camera head may be adjusted by a user.

20. A system according to claim 1 further comprising a camera mounted on the camera head.

21. An automated camera head pan and tilt compensation system comprising:
   a camera support structure;
   a camera head coupled to the camera support structure and adapted to pan and tilt;
   a subject matter position sensing means configured to monitor and transmit via suitable communication means data relating to movement of a subject matter; and a processing system configured to receive and process the data from the subject matter position sensing means and transmit signals to pan and tilt the camera head to compensate for movements of the subject matter so that after an initial position of a subject matter is defined, a camera when mounted to the camera head can be moved freely around a set during filming while maintaining its field of view generally centered on a position of a subject matter defined within the processing system without a need to rehearse camera movements prior to filming and pre-record positions that the camera is expected to take during filming.

22. A system according to claim 21, wherein the position of a subject matter defined within the processing system is defined in three-dimensional space relative to a predefined coordinate system.

23. A system according to claim 21, wherein the subject matter sensing means includes a global positioning device.

24. A system according to claim 23, wherein the camera support structure includes a leveling head coupled to the camera head, wherein the leveling head includes a leveling mechanism configured to maintain a defined member parallel to a defined plane in response to changes in rotation of the crane arm about the horizontal axis.

25. The automated camera head pan and tilt compensation system according to claim 21 further comprising means by which the compensation of tilt and pan of the camera head may be adjusted by a user.

26. A method for automatically compensating the pan and tilt of a camera head coupled to a camera support structure comprising the following steps:
   (a) defining a coordinate system within a processing system;
   (b) defining within the processing system an initial position of a subject matter relative to the coordinate system;
   (c) monitoring movement of the camera support structure;
   (d) sending data relating to the movement of the camera support structure to the processing system;
   (e) receiving of the data relating to the movement of the camera support structure by the processing system; and
   (f) sending signals from the processing system to pan and tilt the camera head to compensate for movement of the camera support structure so that a camera when coupled to the camera support structure can be moved freely around a set during filming While maintaining its field of view generally centered on the position of a subject matter defined within the processing system without a need to rehearse camera movements prior to filming and pre-record positions that the camera is expected to take during filming.

27. A method according to claim 26 further including the steps of
   (g) monitoring movement of the subject matter;
   (h) sending data relating to the movement of the subject matter to the processing system;
   (i) receiving of the data relating to the movement of the subject matter by the processing system; and
   (j) sending signals from the processing system to pan and tilt the camera head to compensate for movement of the subject matter so that a camera when coupled to the camera support structure maintains its field of view generally centered on the position of a subject matter defined within the processing system.

28. A method for automatically compensating pan and tilt of a camera head coupled to a camera support structure, comprising the steps of:
   (a) defining a coordinate system within a processing system;
   (b) defining within the processing system an initial position of a subject matter relative to the coordinate system;
   (c) monitoring movement of the subject matter;
   (d) sending data relating to the movement of the subject matter to the processing system;
   (e) receiving of the data relating to the movement of the subject matter by the processing system; and
   (f) sending signals from the processing system to pan and tilt the camera head to compensate for movement of the subject matter so that a camera when coupled to the camera support structure can be moved freely around a set during filming while maintaining its field of view generally centered on the position of a subject matter defined within the processing system without a need to rehearse camera movements prior to filming and pre-record positions that the camera is expected to take during filming.

* * * * *